(12) United States Patent
Eyole et al.

(10) Patent No.: US 11,269,646 B2
(45) Date of Patent: Mar. 8, 2022

(54) INSTRUCTION SCHEDULING PATTERNS ON DECOUPLED SYSTEMS

(71) Applicant: Arm Limited, Cambridge (GB)

(72) Inventors: Mbou Eyole, Soham (GB); Michiel Willem Van Tol, Cambridge (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 17/215,394

(22) Filed: Mar. 29, 2021

(65) Prior Publication Data

US 2021/0342156 A1    Nov. 4, 2021

(30) Foreign Application Priority Data

Apr. 30, 2020  (GB) .................................... 2006365

(51) Int. Cl.
*G06F 9/30* (2018.01)
*G06F 9/38* (2018.01)

(52) U.S. Cl.
CPC ......... *G06F 9/3836* (2013.01); *G06F 9/3017* (2013.01); *G06F 9/30043* (2013.01); *G06F 9/30047* (2013.01); *G06F 9/30058* (2013.01); *G06F 9/30145* (2013.01); *G06F 9/3802* (2013.01); *G06F 9/3885* (2013.01)

(58) Field of Classification Search
None
See application file for complete search history.

(56) References Cited

U.S. PATENT DOCUMENTS

| 8,176,298 | B2 * | 5/2012 | Hass | H04L 49/00 712/214 |
| 8,230,423 | B2 * | 7/2012 | Frigo | G06F 9/461 718/102 |
| 8,539,203 | B2 * | 9/2013 | Adachi | G06F 9/3851 712/214 |
| 10,613,866 | B2 * | 4/2020 | Padmanabha | G06F 9/3808 |
| 10,929,139 | B2 * | 2/2021 | Hsu | G06F 9/3836 |

(Continued)

FOREIGN PATENT DOCUMENTS

| EP | 2 282 265 | 2/2011 |
| WO | 03/091874 | 11/2003 |

OTHER PUBLICATIONS

Search Report for GB20066365.7 , dated Oct. 15, 2020, 4 pages.
(Continued)

*Primary Examiner* — Corey S Faherty
(74) *Attorney, Agent, or Firm* — Nixon & Vanderhye P.C.

(57) ABSTRACT

Apparatuses and methods for instruction scheduling in an out-of-order decoupled access-execute processor are disclosed. The instructions for the decoupled access-execute processor comprises access instructions and execute instructions, where access instructions comprise load instructions and instructions which provide operand values to load instructions. Schedule patterns of groups of linked execute instructions are monitored, where the execute instructions in a group of linked execute instructions are linked by data dependencies. On the basis of an identified repeating schedule pattern configurable execution circuitry adopts a configuration to perform the operations defined by the group of linked execute instructions of the repeating schedule pattern.

20 Claims, 14 Drawing Sheets

(56) References Cited

U.S. PATENT DOCUMENTS

| | | | |
|---|---|---|---|
| 2007/0157008 A1* | 7/2007 | Sodani | G06F 9/3844 |
| | | | 712/239 |
| 2016/0103682 A1* | 4/2016 | Alexander | G06F 12/0875 |
| | | | 711/125 |
| 2018/0285111 A1 | 10/2018 | Padmanabha et al. | |
| 2020/0012618 A1 | 1/2020 | Parandeh Afshar et al. | |
| 2020/0026513 A1* | 1/2020 | Akin | G06F 9/3004 |

OTHER PUBLICATIONS

U.S. Appl. No. 16/658,490, filed Oct. 21, 2019, Eyole et al.
U.S. Appl. No. 16/658,494, filed Oct. 21, 2019, Eyole.
Macro-Operation Fusion (MOP Fusion)—WikiChip, https://en.wikichip.org/wiki/macro-operation_fusion, 7 pages, retrieved Apr. 22, 2020.
The microarchitecture of Intel and AMD CPUs, Secs 8.4 and 8.5, 3 pages.
Frumusanu, "Arm's New Cortex-A77 CPU Micro-architecture: Evolving Performance" The Cortex-A77 μarch: Going For A 6-Wide Front-End, Apr. 21, 2020, 5 pages.
Celio et al., "The Renewed Case for the Reduced Instruction Set Computer: Avoiding ISA Bloat with Macro-Op Fusion for RISC-V", Electrical Engineering and Computer Sciences, University of California at Berkeley, Technical Report No. UCB/EECS-2016-130, http://www.eecs.berkeley.edu/Pubs/TechRpts/2016/EECS.2016-130.html, Jul. 8, 2016, 18 pages.

* cited by examiner

INSTRUCTION SCHEDULING PATTERNS ON DECOUPLED SYSTEMS

This application claims priority to GB Patent Application No. 2006365.7 filed 30 Apr. 2020, the entire contents of which is hereby incorporated by reference.

The present techniques relate to data processing.

The determination of an appropriate instruction execution schedule may be a key part of arranging for the efficient operation of a data processing apparatus which executes a sequence of program instructions. In an in-order processor the schedule may be largely determined by a compiler, where this is usually under the guidance of carefully constructed heuristics which consider the data processor's execution characteristics and any potential instruction latencies. In an out-of-order processor the schedule is more dynamic and is usually assembled on-the-fly based on the dependencies of instructions and the availability of functional units. In contrast to the in-order processor, the out-of-order processor is better equipped to handle the variability introduced at runtime due to variable latencies with which operations may be performed (as result of cache misses, for example). In addition branch mis-speculation events and other front-end disturbances may cause the execution schedule of an out-of-order processor to be amended periodically. On the one hand, when there are a limited number of miss-speculation events, exceptions, front-end disturbances, and cache misses, the schedule of an out-of-order processor can be relatively stable. However on the other hand, such events cannot be entirely avoided, since they are side-effects of the generally performance enhancing features which are supported, such as branch speculation, data caching, and so on.

In one example embodiment there is an apparatus comprising: instruction fetch circuitry to retrieve a sequence of instructions, wherein the sequence of instructions comprises access instructions and execute instructions, wherein the access instructions comprise load instructions and instructions which provide operand values to load instructions; decoupled access-execute processing circuitry comprising access instruction processing circuitry to handle the access instructions and execute instruction processing circuitry to handle the execute instructions, wherein the access instruction processing circuitry is capable of executing the access instructions out of program order with respect to the execute instructions, and wherein the execute instruction processing circuitry is capable of executing the execute instructions out of program order; instruction schedule monitoring circuitry to monitor schedule patterns of groups of linked execute instructions, wherein the execute instructions in a group of linked execute instructions are linked by data dependencies, and to identify a repeating schedule pattern which repeats when the sequence of instructions is executed; and configurable execution circuitry responsive to identification of the repeating schedule pattern to adopt a configuration to perform operations defined by the group of linked execute instructions of the repeating schedule pattern.

In one example embodiment there is a method of data processing comprising: retrieving a sequence of instructions, wherein the sequence of instructions comprises access instructions and execute instructions, wherein the access instructions comprise load instructions and instructions which provide operand values to load instructions; in decoupled access-execute processing circuitry handling the access instructions using access instruction processing circuitry and handling the execute instructions in execute instruction processing circuitry, wherein the access instruction processing circuitry is capable of executing the access instructions out of program order with respect to the execute instructions, and wherein the execute instruction processing circuitry is capable of executing the execute instructions out of program order; monitoring schedule patterns of groups of linked execute instructions, wherein the execute instructions in a group of linked execute instructions are linked by data dependencies; identifying a repeating schedule pattern which repeats when the sequence of instructions is executed; and in response to identification of the repeating schedule pattern, causing configurable execution circuitry to adopt a configuration to perform operations defined by the group of linked execute instructions of the repeating schedule pattern.

The present techniques will be described further, by way of example only, with reference to embodiments thereof as illustrated in the accompanying drawings, in which:

FIG. 1 schematically illustrates a data processing apparatus according to some embodiments;

FIG. 2 schematically illustrates a data processing apparatus according to some embodiments FIG. 3 illustrates the process by which a dataflow graph of execute instructions is memorised according to some embodiments;

FIG. 4 is a flow diagram showing a sequence of steps which are taken according to the method of some embodiments;

FIG. 5 schematically illustrates instruction schedule monitoring circuitry according to some embodiments;

FIG. 6 schematically illustrates a data processing apparatus according to some embodiments;

FIG. 7A schematically illustrates a reconfigurable execution engine comprising a cross-linked network of functional units according to some embodiments;

FIG. 7B schematically illustrates in more detail one of the functional units from FIG. 7A;

FIGS. 8A, 8B, and 8C are a flow diagram showing a sequence of steps which are taken according to the method of some embodiments;

Figure 1:
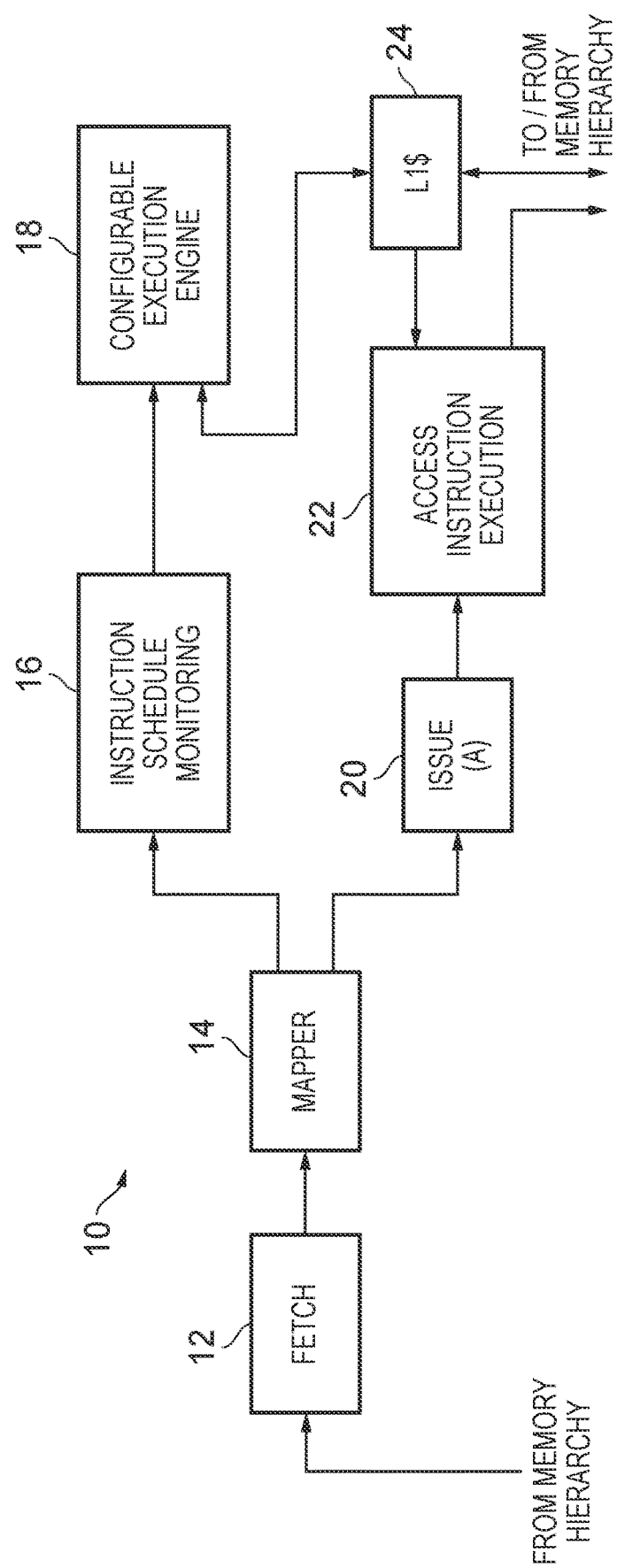

At least some embodiments provide an apparatus comprising: instruction fetch circuitry to retrieve a sequence of instructions, wherein the sequence of instructions comprises access instructions and execute instructions, wherein the access instructions comprise load instructions and instructions which provide operand values to load instructions; decoupled access-execute processing circuitry comprising access instruction processing circuitry to handle the access instructions and execute instruction processing circuitry to handle the execute instructions, wherein the access instruction processing circuitry is capable of executing the access instructions out of program order with respect to the execute instructions, and wherein the execute instruction processing circuitry is capable of executing the execute instructions out of program order; instruction schedule monitoring circuitry to monitor schedule patterns of groups of linked execute instructions, wherein the execute instructions in a group of linked execute instructions are linked by data dependencies, and to identify a repeating schedule pattern which repeats when the sequence of instructions is executed; and configurable execution circuitry responsive to identification of the repeating schedule pattern to adopt a configuration to perform operations defined by the group of linked execute instructions of the repeating schedule pattern.

Despite the above-mentioned largely unavoidable types of events which may disrupt the schedule of an out-of-order processor (such as mis-speculations, exceptions, front-end disturbances, and cache misses), the present techniques are based on the discovery that relatively stable instruction execution schedules can nonetheless be identified for an out-of-order processor, in particular when the processor is arranged according to the decoupled access-execute paradigm. This approach to the operation of a processor categorises program instructions into two types: "access" instructions and "execute" instructions, where the aim is to carry out the access instructions as early as possible with respect to the execute instructions, such that the latencies which are necessarily encountered in connection with carrying out the access instructions may largely be hidden. Access instructions are those which are responsible for obtaining values from memory (i.e. these are load instructions, or instructions which provide operand values for load instructions, either directly or indirectly). Execute instructions are those which perform arithmetical, logical and other operations on the values retrieved from memory. More generally the execute instructions may be categorised as all instructions upon which load instructions do not directly or indirectly depend. Against this background the present techniques focus on the "execute phase", recognising that the latencies associated with load instructions (in the "access phase") can be highly variable and thus potentially disrupt any attempted static instruction execution schedule. By contrast, it has been found that by focusing on the execute phase a sufficient degree of temporal stability can be established during the execution of the program to allow instruction schedules for portions of the execute instructions to be found and made use of. Further, the present techniques are based on an approach of identifying groups of linked execute instructions, wherein the execute instructions in a group of linked execute instructions are linked by data dependencies. Such a group of linked execute instructions may for example be identified with reference to a (conceptual) dataflow graph representing the data dependencies between the execute instructions. On this basis a repeating schedule pattern may be identified. Configurable execution circuitry is provided and when such a repeating schedule pattern is identified, the configurable execution circuitry is set up to perform the operations defined by the group of linked execute instructions of the repeating schedule pattern.

As such it will be recognised that the techniques presented herein take a novel approach with respect to related techniques in the prior art. For example previous high-performance processors have been proposed which support "macro-op fusion", seeking to increase issue queue bandwidth and to decrease the latency between operations. Macro-op fusion involves combining operations performed by a small number of adjacent instructions into a single macro-op operation that can be issued and executed as a single operation. The possible operations that can be combined into a single macro-op are usually predefined and specialised hardware is normally provided within the front-end of the processor pipeline to detect specific patterns. By contrast the present techniques propose gathering a number of instructions into a single operation based solely on their dependencies and the frequency of occurrence of a specific dataflow pattern. As such the groupings of execute instructions that are gathered together are speculative in the sense that the grouping of operations might later be deemed to have been performed in error. The fused macro-ops of the prior art are not speculative in the same sense. In addition prior art macro-op fusion usually requires that the fused operations are in close proximity in program order, whilst the present techniques can allow an arbitrary number of operations (even branches) to be present between the instructions which are grouped together.

In some embodiments the apparatus further comprises instruction counting circuitry to maintain count values of instances of the access instructions and the execute instructions encountered in the sequence of instructions, wherein the instruction schedule monitoring circuitry is arranged to identify the groups of linked execute instructions using an iterative dataflow graph elaboration procedure, and wherein the instruction schedule monitoring circuitry is arranged to identify a set of access instructions as primary nodes for the iterative dataflow graph elaboration procedure based on the access instructions of the set of access instructions having count values in the instruction counting circuitry which are greater than an instruction count minimum and which differ by less than a threshold access instruction count difference. Thus in order to begin the process of identifying a group of linked execute instructions, this may begin with the identification of certain access instructions, in particular those which produce values consumed by execute instructions. Based on this starting point, the subsequent identification of a group of linked execute instructions may be carried out using an iterative dataflow graph elaboration procedure. The dataflow graph represents the data dependencies between the execute instructions and thus this dataflow graph may be iteratively elaborated. Thus from a first step of the starting point of the access instructions which produce values which are consumed by a first set of execute instructions, that first set of execute instructions becomes the basis for the next step, with a further set of execute instruction being identified which consume values produces by the first set of execute instructions. The dataflow graph is thus elaborated. Furthermore by counting instances of the access instructions and the execute instructions encountered in the sequence of instructions, instructions which tend to repeat together can be identified. An instruction count minimum provides a minimum basis for the process to start and similar instruction counts (which differ from one another by less than a threshold access instruction count difference) allow the groups of instructions to be identified.

Other constraints may be imposed on the instructions identified when seeking to establish an instruction schedule, and in some embodiments the instruction schedule monitoring circuitry is arranged to identify up to a predetermined maximum number of access instructions for the set of access instructions identified as primary nodes for the iterative dataflow graph elaboration procedure. This enables the procedure to be tailored to the capabilities and capacities of the apparatus. In particular the number of primary nodes used in the iterative dataflow graph elaboration procedure defines the "width" of the dataflow graph, which also relates to the number of functional units which may be needed to be active in parallel with one another in the configurable execution circuitry.

The iterative dataflow graph elaboration procedure may be carried out in a variety of ways, but in some embodiments the instruction schedule monitoring circuitry is arranged to perform the iterative dataflow graph elaboration procedure comprising: identifying candidate execute instructions for a candidate group of linked execute instructions, wherein the candidate execute instructions have one or more inputs which depend on result values of the set of access instructions identified as primary nodes, and wherein the candidate execute instructions have count values in the instruction counting circuitry which differ by less than a threshold execute instruction count difference from the count values of the set of access instructions. Thus further use may be made of the counting circuitry to identify the candidate execute instructions, where the counts of these execute instructions are constrained not to differ from the counts of the set of access instructions (forming the input nodes) by more than a threshold amount, to thus identify groups of instructions (started by access instructions and followed by execute instructions), which appear to be repeating together as a set.

In some embodiments the instruction schedule monitoring circuitry is arranged to perform the iterative dataflow graph elaboration procedure in a sequence of steps, wherein at a first step of the sequence of steps one or more first step execute instructions of the candidate execute instructions are identified, wherein the one or more first step execute instructions have one or more inputs which directly depend without intermediary on result values of the set of access instructions identified as primary nodes, and wherein at a subsequent step of the sequence of steps one or more subsequent execute instructions of the candidate execute instructions are identified, wherein the one or more subsequent step execute instructions have one or more inputs which directly depend without intermediary on result values of the one or more first step execute instructions.

In some embodiments at each further step of the sequence of steps one or more further execute instructions of the candidate execute instructions are identified, wherein the one or more further execute instructions have one or more inputs which directly depend without intermediary on result values of one or more execute instructions at an immediately preceding step.

The iterative dataflow graph elaboration procedure may be arranged to progress for as long as the repeating schedule pattern thus identified can be supported. As such, the iterative dataflow graph elaboration procedure may be terminated when various conditions are met, individually or in combination, in the apparatus or specifically within the elaboration procedure.

In some embodiments the instruction schedule monitoring circuitry is arranged to terminate the iterative dataflow graph elaboration procedure on reaching a predetermined maximum number of steps for the sequence of steps. In some embodiments the instruction schedule monitoring circuitry is arranged to terminate the iterative dataflow graph elaboration procedure on reaching a predetermined maximum number of operations for the group of linked execute instructions of the repeating schedule pattern. In some embodiments the instruction schedule monitoring circuitry is arranged to terminate the iterative dataflow graph elaboration procedure on reaching a predetermined maximum number of functional units of the configurable execution circuitry required to be used in the configuration to perform the operations defined by the group of linked execute instructions of the repeating schedule pattern. In some embodiments the instruction schedule monitoring circuitry is arranged to terminate the iterative dataflow graph elaboration procedure on reaching a predetermined maximum number of output operands for the operations defined by the group of linked execute instructions of the repeating schedule pattern.

The instruction schedule monitoring circuitry may terminate the iterative dataflow graph elaboration procedure when one or more of a range of conditions become true, depending on the configuration of the apparatus and its capabilities. In some embodiments the instruction schedule monitoring circuitry is arranged to terminate the iterative dataflow graph elaboration procedure on reaching a store step of the sequence of steps at which the candidate execute instructions comprise only store instructions.

Branch instructions present a potential disruption to the establishment of a stable, iterating instruction schedule, since under some conditions the branch will not be taken and under other conditions the branch will be taken. Accordingly in some embodiments the instruction schedule monitoring circuitry is arranged to terminate the iterative dataflow graph elaboration procedure on reaching a branch step of the sequence of steps at which the candidate execute instructions comprise at least one data-dependent branch instruction. However the presence of a branch instruction does not necessarily need to prevent (or at least terminate) the establishment of a stable instruction schedule, since it may be the case that a given branch instruction at a particular point in the program is, for example, commonly not taken and only rarely taken. In this example a useful instruction schedule may therefore still be established on the assumption that that branch will not be taken. Conversely the occasions on which the branch is taken may be rare enough to nonetheless make the establishment and use of the instruction schedule worthwhile. Accordingly in some embodiments, on reaching a branch step of the sequence of steps at which the candidate execute instructions comprise at least one data-dependent branch instruction, the instruction schedule monitoring circuitry is arranged to cause the configuration adopted by the configurable execution circuitry to comprise at least one branch outcome input indicative of a currently prevailing outcome of the at least one data-dependent branch instruction, wherein the at least one branch outcome input will cause the configurable execution circuitry to speculatively perform the operations defined by the group of linked execute instructions of the repeating schedule pattern based on the at least one branch outcome input. The currently prevailing outcome of the at least one data-dependent branch instruction may be obtained from structures such as branch history storage in the apparatus.

Alternatively, when sufficient resources are available, a parallelized approach to the branch may be taken. Accordingly in some embodiments, on reaching a branch step of the sequence of steps at which the candidate execute instructions comprise at least one data-dependent branch, the instruction schedule monitoring circuitry is arranged to cause the configurable execution circuitry to adopt a parallelized configuration to perform at least two parallel versions of the operations defined by the group of linked execute instructions of the repeating schedule pattern, wherein the at least two parallel versions of the operations assume different outcomes of the at least one data-dependent branch instruction, and wherein the apparatus is arranged to select between result values of the at least two parallel versions of the operations after an outcome of the at least one data-dependent branch instruction is known.

It has further been found that, once the iterative dataflow graph elaboration procedure has been terminated, a further dataflow graph may usefully be elaborated which directly follows the dataflow graph just terminated. Accordingly, in some embodiments the instruction schedule monitoring circuitry is responsive to the iterative dataflow graph elaboration procedure being terminated at a final step of the sequence of steps: to determine whether there are following execute instructions of the candidate execute instructions which receive values from the execute instructions of the final step of the sequence of steps, and when there are said following execute instructions to use the following execute instructions as new primary nodes for a new iterative dataflow graph elaboration procedure.

Although the data dependencies within a dataflow graph are defined by the sequence of program instructions on which the dataflow graph is based and are therefore necessarily not changeable, it has nevertheless been found that the instruction schedule monitoring circuitry may usefully influence when certain execute instructions are executed. The apparatus has some flexibility in this regard, being an out-of-order device. This technique may for example be made use of when taking account of the capacity of the configurable execution circuitry for parallel operation execution. Accordingly, in some embodiments the instruction schedule monitoring circuitry is responsive to a required number of operations at a current step of the sequence of steps exceeding a capacity of the configurable execution circuitry by repositioning at least one operation of the current step into a subsequent step of the sequence of steps. The dataflow is thus not changed, but the delay in when the configurable execution circuitry will carry out the repositioned operation(s) allows execution of the required operations to stay within the execution bandwidth of the configurable execution circuitry.

Whilst the instruction schedule may be defined and stored in a variety of ways, it may be useful to represent the instruction schedule as a macro-instruction. Accordingly in some embodiments, the instruction schedule monitoring circuitry is arranged to create a macro-instruction to substitute for the group of linked execute instructions of the repeating schedule pattern. The creation of such a macro-instruction enables this macro-instruction to be treated in much the same way as other program instructions, which may facilitate its integration with various functional components of the apparatus.

When such a macro-instruction has been established for substitution for a group of linked execute instructions of the repeating schedule pattern the execute instructions may nonetheless continue to be monitored in ongoing program execution in order to confirm that the substitution of the macro-instruction for those execute instructions continues to be appropriate. This may for example be done by the use of the counting circuitry and accordingly in some embodiments during further execution of the sequence of instructions substitution of the macro-instruction for the group of linked execute instructions of the repeating schedule pattern is dependent on updates for count values of the execute instructions of the group of linked execute instructions of the repeating schedule pattern not differing from one another.

The configurable execution circuitry may be arranged to facilitate the use of macro-instructions and in some embodiments the apparatus further comprises a set of primary node result FIFO buffers, wherein the configuration adopted by the configurable execution circuitry comprises arranging that result values of the set of access instructions identified as primary nodes provide inputs to the set of primary node result FIFO buffers, and outputs of the set of primary node result FIFO buffers provide input operands for the macro-instruction. Similarly in some embodiments the apparatus further comprises a set of macro-instruction result FIFO buffers, wherein the configuration adopted by the configurable execution circuitry comprises arranging that one or more result values of the macro-instruction provide inputs to the set of macro-instruction result FIFO buffers. The use of such input and output FIFO buffers also enabled timing differences to be absorbed, such that the rate at which the macro-instruction executes is decoupled from the rate of arrival of input values and/or the rate of consumption of output values.

The outputs of the set of macro-instruction result FIFO buffers may be coupled into the remainder of the apparatus in a variety of ways, but in some embodiments the outputs of the set of macro-instruction result FIFO buffers provide inputs to one or more physical registers onto which one or more architectural registers specified as destinations of the one or more result values of the macro-instruction have been mapped.

Further, the configurable execution circuitry may also be provided with a variety of connections to other system components and even to itself. For example in some embodiments the configurable execution circuitry comprises at least one result feedback path leading from an output of the configurable execution circuitry to an input of the configurable execution circuitry, and wherein the configuration adopted by the configurable execution circuitry comprises arranging that at least one result value of the macro-instruction is provided via the at least one result feedback path to at least one input of the configurable execution circuitry.

As mentioned above, a macro-instruction may be treated in much the same way as other program instructions, and one such example arises in the case of some embodiments in which the apparatus further comprises register renaming circuitry to perform register renaming for execute instructions to map architectural registers specified in the execute instructions onto physical registers, wherein locations of input operands for the macro-instruction and one or more result values of the macro-instruction are defined with reference to the architectural registers, and wherein the register renaming circuitry is arranged to perform the register renaming for the macro-instruction.

A macro-instruction or macro-instructions generated may be stored in a variety of ways, but in some embodiments the apparatus further comprises macro-instruction cache storage to temporarily store entries for macro-instructions created by the instruction schedule monitoring circuitry, wherein each entry comprises an indication of the group of linked execute instructions of the repeating schedule pattern, and the instruction schedule monitoring circuitry is arranged to reference the macro-instruction cache storage when performing the iterative dataflow graph elaboration procedure in order to reuse a portion of the configuration for the configurable execution circuitry generated by a previously created macro-instruction. Such a macro-instruction cache storage thus provides the opportunity for reference by the instruction schedule monitoring circuitry and to reuse previously established configurations for the configurable execution circuitry.

Situations may arise in which the instruction schedule monitoring circuitry encounters a node in a dataflow graph which has already been added to a macro-instruction and this may be handled in a variety of ways. This may for example occur in connection with accumulating instructions of a sequence of operations which read and then overwrite one or more of their input operands (e.g. multiply-accumulate operations). In some embodiments the instruction schedule monitoring circuitry is responsive, in the iterative dataflow graph elaboration procedure, to a further instance of an execute instruction where an earlier instance of the execute instruction already forms part of the under-elaboration group of linked execute instructions, to add an input of the execute instruction to inputs of the configuration to perform the operations and to add an output of the execute instruction to outputs of the configuration to perform the operations. In some embodiments the instruction schedule monitoring circuitry is responsive, in the iterative dataflow graph elaboration procedure, to a further instance of an execute instruction where an earlier instance of the execute instruction already forms part of the under-elaboration group of linked execute instructions, to cause the configuration to perform the operations to hold a temporary value resulting from the earlier instance of the execute instruction and use the temporary value as an input of the further instance of an execute instruction. In some embodiments the instruction schedule monitoring circuitry is responsive, in the iterative dataflow graph elaboration procedure, to a further instance of an execute instruction where an earlier instance of the execute instruction already forms part of the under-elaboration group of linked execute instructions, to aggregate the further instance of the execute instruction with the earlier instance of the execute instruction to form a linked sequence of the instances of the execute instruction in the under-elaboration group of linked execute instructions. When such a linked sequence is formed the instruction schedule monitoring circuitry may be arranged to form the linked sequence of the instances of the execute instruction dependent on a minimum group size for the linked sequence of the instances of the execute instruction.

The configurable execution circuitry may be variously provided. In some embodiments the configurable execution circuitry comprises a plurality of functional units, wherein the plurality of functional units are arranged to forward respective functional unit result values directly to one another without the respective functional unit result values being stored in a physical register file as an intermediary. This supports the independent operation of the configurable execution circuitry and avoids physical register files of the apparatus being occupied, leaving them available for other concurrent operations of the apparatus to use. The plurality of functional units may take a variety of forms. In some embodiments at least some of the plurality of functional units are provided by a coarse-grained reconfigurable array. In some embodiments at least some of the plurality of functional units are provided by a field-programmable gate array. In some embodiments at least some of the plurality of functional units are provided by a very-long-instruction-word architecture.

At least some embodiments provide a method of data processing comprising: retrieving a sequence of instructions, wherein the sequence of instructions comprises access instructions and execute instructions, wherein the access instructions comprise load instructions and instructions which provide operand values to load instructions; in decoupled access-execute processing circuitry handling the access instructions using access instruction processing circuitry and handling the execute instructions in execute instruction processing circuitry, wherein the access instruction processing circuitry is capable of executing the access instructions out of program order with respect to the execute instructions, and wherein the execute instruction processing circuitry is capable of executing the execute instructions out of program order; monitoring schedule patterns of groups of linked execute instructions, wherein the execute instructions in a group of linked execute instructions are linked by data dependencies; identifying a repeating schedule pattern which repeats when the sequence of instructions is executed; and in response to identification of the repeating schedule pattern, causing configurable execution circuitry to adopt a configuration to perform operations defined by the group of linked execute instructions of the repeating schedule pattern.

Some particular embodiments are now described with reference to the figures.

FIG. 1 schematically illustrates a data processing apparatus 10 according to some embodiments. A pipelined configuration shown according to which instructions to be executed are retrieved by the fetch circuitry 12 from a memory hierarchy. Further the data processing apparatus 10 is arranged according to the decoupled access-execute paradigm, wherein program instructions are categorised into two types: "access" instructions and "execute" instructions. Generally, the aim of this approach is to carry out the access instructions as early as possible with respect to the execute instructions, such that the latencies which are necessary encountered in connection with carrying out the access instructions may largely be hidden. Access instructions are those which are responsible for obtaining values from memory (i.e. these are load instructions, or instructions which provide operand values for load instructions, either directly or indirectly). Execute instructions are those which perform arithmetical, logical and other operations on the values retrieved from memory. More generally the execute instructions may be categorised as all instructions upon which load instructions do not directly or indirectly depend. Instructions for execution are passed from the fetch circuitry 12 to a mapper stage 14. The mapper stage 14 is provided to determine whether each received instruction is an "access" instruction or "execute" instruction and to forward the instruction differently on that basis. There are various ways in which the mapper 14 may determine the respective category of each instruction. For example, this may be done on the basis of explicit labelling of each instruction as belonging to one category or the other. Alternatively the mapper 14 may be provided with the capability to determine on-the-fly the category into which each instruction received should be placed. For the purposes of the present discussion it is assumed that each instruction is labelled according to its access or execute type, however more detail of configurations according to which the mapper 14 has such on-the-fly category to determination capability can for example be found in EP patent applications 19386043.4 and 19386044.2, and in U.S. patent application Ser. Nos. 16/658, 490 and 16/658,494. The mapper 14 then forwards each instruction on the basis of its access/execute type, with execute instructions being passed via the upper path in the illustration of FIG. 1, comprising the instruction schedule monitoring circuitry 16 and the configurable execution engine 18. Conversely access instructions are passed via the lower path in the illustration of FIG. 1, comprising the issue stage 20 and the access instruction execution circuitry 22. Note however that although the access and execute instructions are passed via these separate routes for execution, the instruction schedule monitoring circuitry 16 may nonetheless be provided with indications of all instructions to be executed, since in some embodiments the iteration counts of both access and execute instructions are used to identify those instructions which belong to a repeating instruction schedule. Generally the access instructions are issued as soon as possible from the issue circuitry 20 and executed as soon as possible by the access instruction execution circuitry 22, since completion of these instructions may require data values to be retrieved from levels of the memory hierarchy which incur significant latency. The advance execution of these access instructions seeks to provide that the data values which are retrieved are available to the execute instructions when required and without causing stalling delays. The apparatus 10 is shown in FIG. 1 to further comprise an L1 cache 24 into which data values retrieved from the memory hierarchy may be stored and to which the configurable execution engine 18 has access. Execute instructions which are passed from the mapper 14 are monitored by the instruction schedule monitoring circuitry 16 to seek to identify groups of linked execute instructions which may have a repeating schedule pattern. It is to be understood therefore that according to the illustration of FIG. 1 that in some periods of operation (for example in an initial phase, when such repeating schedule patterns have not yet been identified) execute instructions may be passed from the instruction schedule monitoring circuitry 16 to the configurable execution engine 18 for "individual" execution without having yet been grouped into a group of linked execute instructions. Indeed even when such groups have been identified as the basis for repeating schedule patterns, other "independent" execute instructions which are never found to belong to a repeating schedule pattern may well continue to be encountered and passed to the configurable execution engine for individual execution. The linked execute instructions are linked by their data dependencies such that a dataflow graph may be used to represent the dataflow into, through and from a group of linked execute instructions. This process will be described in more detail below with reference to the figures which follow. Once such a repeating schedule pattern has been identified the instruction schedule monitoring sends corresponding control signals to the configurable execution circuitry 18, such that it then adopts a configuration to perform operations defined by the group of linked execute instructions of the repeating schedule pattern.

Figure 2:
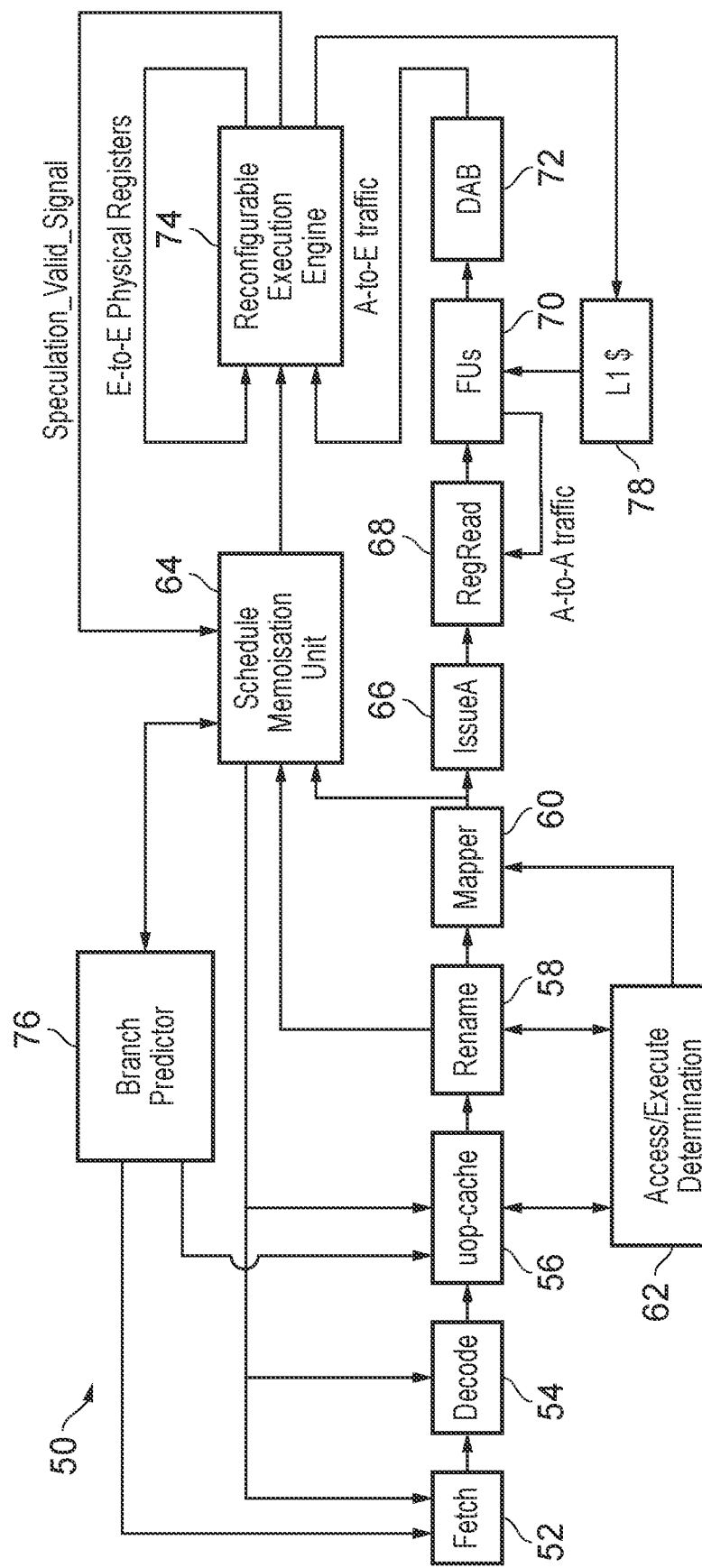

FIG. 2 schematically illustrates more detail of a data processing apparatus 50 according to some embodiments. As in the case of the apparatus in FIG. 1, a pipelined configuration is shown beginning with fetch circuitry 52. The further initial stages of the pipeline shown are represented as the decode circuitry 54, the micro-op (µ-op) cache 56, the rename circuitry 58, and the mapper stage 60. An additional component associated with the micro-op cache 56 and the rename circuitry 58 is the access/execute determination circuitry 62. This circuitry is provided to determine on-the-fly whether instructions should be characterised as access or execute. Once they have been categorised instructions may be labelled in the micro-op cache by type such that determination does not need repeating. The association with the rename circuitry 58 enables the access/execute determination circuitry 62 to take into account data dependencies between instructions, since these may affect an instruction's categorisation (for example an arithmetic instruction which provides a value which is subsequently used by a load instruction as one of its operands is itself an access instruction). The mapper stage 50 forwards instructions for execution dependent on their categorisation. Execute instructions are passed to the schedule memorisation unit 64, whilst access instructions are passed to the access issue circuitry 66. Note once more that, as mentioned above with respect to the apparatus 10 shown in FIG. 1, although the access and execute instructions are passed via these separate routes for execution, the schedule memorisation unit 64 may nonetheless be provided with indications of all instructions to be executed, since in some embodiments the iteration counts of both access and execute instructions are used to identify those instructions which belong to a repeating instruction schedule. The data processing apparatus 50 operates in accordance with the decoupled access-execute paradigm and therefore access issue circuitry 66 is arranged to issue access instructions for execution as early as possible, wherein the example illustration of FIG. 2 the access instructions are shown first passing through a register read stage 68, before reaching the functional units 70 which carry out the instructions. Noting that access instructions not only comprise load instructions themselves, but also other instructions which provide (directly or indirectly) values used by the load instructions, the functional units 70 comprise not only load units are arranged to cause data values to be retrieved from memory, but also further arithmetic and logical units required to support the execution of the access instructions which are not themselves load instructions. Some values generated by the operation of the functional units 70 passed back to the register read stage 68 as required ("A-to-A traffic"). The data processing apparatus 50 in the example of FIG. 2 is shown to comprise a further data storage component in the form of the decoupled access-execute buffer (DAB) 72. This buffer is provided in close association with the functional units 70 and was also directly accessible by the reconfigurable execution engine 74. Data values required by the reconfigurable execution engine in order to carry out the execution instructions which handles and which derive from load instructions may be provided in this manner. The schedule memorisation unit 64 monitors the execute instructions which are received from the mapper stage 60 en route to the reconfigurable execution engine 74. The schedule memorisation unit 64 seeks to identify groups of linked execute instructions which have a repeating schedule pattern. As shown in FIG. 2 the schedule memorisation unit 64 also receives inputs from the rename stage 58, from the branch predictor 76, and from the reconfigurable execution engine 74. The input from the branch predictor 76 provides the schedule memorisation unit 64 with a branch prediction for one or more branch instructions which it encounters within a group of linked execute instructions enabling the schedule memorisation unit 64 to proceed with elaborating such a group on the basis of the assumed direction(s) that the branch instruction(s) will take. When such an assumption is made, and the reconfigurable execution engine 74 subsequently proceeds with speculative instruction execution on the basis of that branch prediction, the reconfigurable execution engine 74 can provide the schedule memorisation unit 64 with information regarding the outcome of that speculation (i.e. whether or not the branch prediction was correct) in the form of the feedback signal ("Speculation_Valid_Signal") from the reconfigurable execution engine 74. The results of the instruction execution carried out by the reconfigurable execution engine 74 may be stored in the L1 cache 78. The L1 cache 78 may also provide certain data values as required to the functional units 70 of the access execution pipeline. Outputs from the schedule memorisation unit 64, in particular in the form of macro-instruction definitions which are created by the schedule memorisation unit, are received by the fetch stage 52, the decoded stage 54, and the micro-op cache 56. This enables the schedule memorisation unit 64 to identify a group of linked execute instructions which have a repeating schedule pattern and to define a corresponding macro instruction which can then be substituted into the sequence of instructions which the data processing apparatus receives. Such substituted macro instruction can then be handled by the pipeline stages in much the same way as an original program instruction, including for example being renamed by the rename stage 58 and the input to the schedule memorisation unit 64 from the rename stage 58 enables the rename stage 58 to signal to the schedule memorisation unit 64 when this has taken place.

Figure 3:
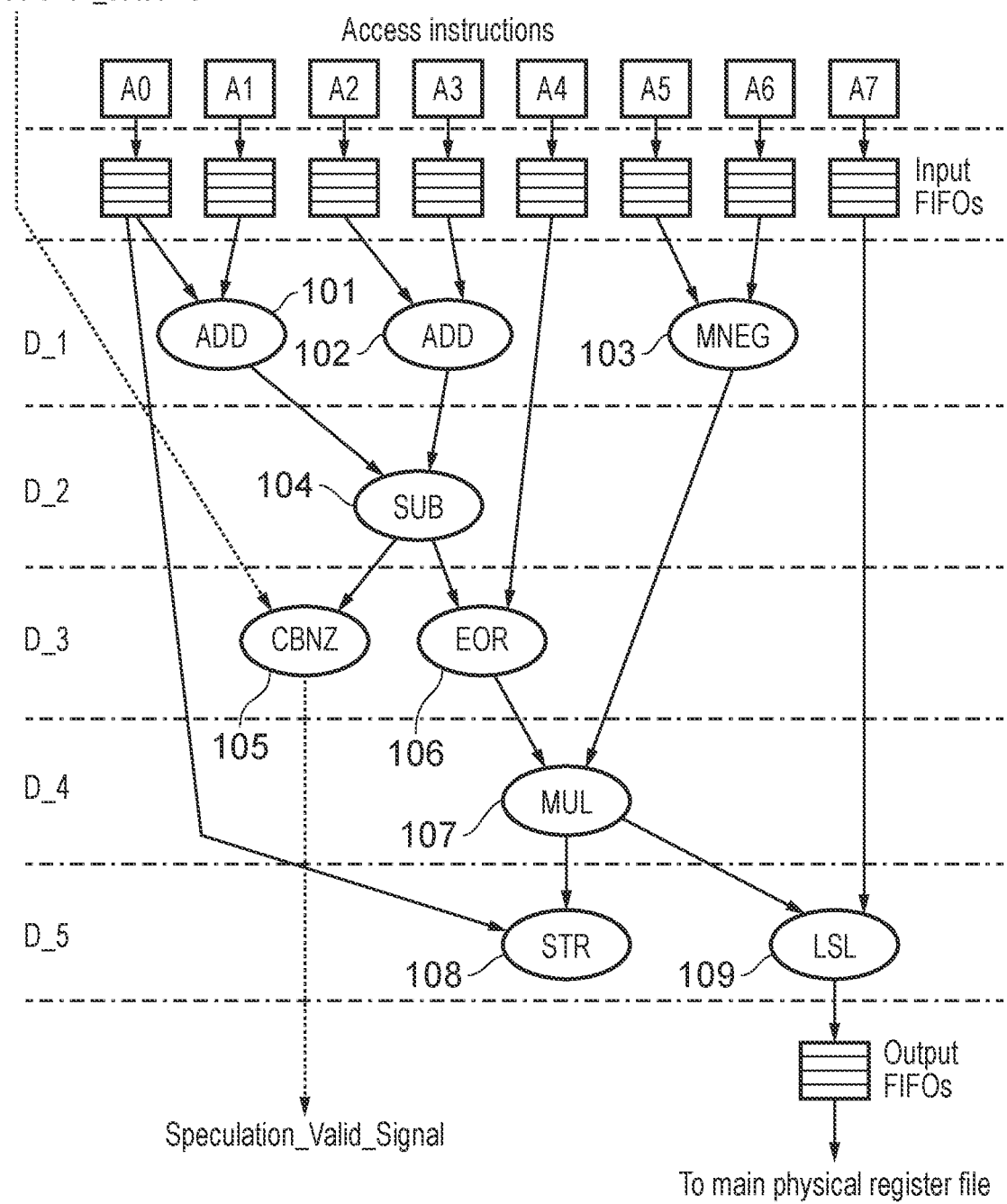

FIG. 3 schematically illustrates the process by which a dataflow graph of execute instructions is elaborated and memorised, as well as how this maps on to the input and output FIFOs of reconfigurable execution circuitry according to some embodiments. An identified set of access instructions A0-A7 provides a set of primary nodes for the dataflow graph. The identification of these access instructions is performed by monitoring iteration counts of access instructions which directly produce values consumed by execute instructions. Amongst those the access instructions with similar iteration counts are selected as the primary nodes. Once the repeating instruction schedule is identified and implemented to be carried out by the reconfigurable execution circuitry (in cooperation with the access execution pipeline), the results of these primary node access instructions are each provided to an input FIFO of the reconfigurable execution circuitry. The use of these input FIFOs enables timing differences to be absorbed and for the results to be made use of when required by the functional units of the reconfigurable execution circuitry. The elaboration of the dataflow graph starting from these primary node access instructions is performed iteratively in "layers", where a total of five layers are schematically illustrated in FIG. 3. At the first layer D_1 execute instructions are found which are in the sensitivity list of the primary nodes A0-A7, and which have similar iteration counts. Instructions in the sensitivity list will have inputs which are derived directly or indirectly from the results of these primary nodes. In the first layer D_1 the instructions are constrained to have a maximum dependency distance of one from the primary nodes, i.e. they receive values directly from at least one primary node. In the example of FIG. 3 these are the instructions: ADD 101, ADD 102, and MNEG 103. At the next layer D_2, instructions are found which have a maximum dependency distance of one from the instructions in layer D_1 and these are added to the layer D_2. In the example of FIG. 3 this is the instruction SUB 104. This process is then iteratively repeated from layer to layer. In the example of FIG. 3, this adds the instructions CBNZ 105 and EOR 106 to layer D_3 and the instruction MUL 107 to layer D_4. In the example shown in FIG. 3, the process terminates at layer D_5, at which a store instruction STR 108 and the instruction LSL 109 are added to the layer. The output of the instruction LSL 109 is thus the only value output of this dataflow graph and once the repeating instruction schedule is identified and implemented to be carried out by the reconfigurable execution circuitry the result of the LSL 109 operation is provided to an output FIFO of the reconfigurable execution circuitry. In the example of FIG. 3 this is then provided to the main register file of the apparatus. Note that two additional information signals are illustrated in FIG. 3. Both relate to the CBNZ instruction 105. The first is an input to the dataflow graph shown, providing a constant value representing the predicted branch outcome for this branch instruction. This constant value will therefore be provided to the reconfigurable execution circuitry as an input when the corresponding instruction schedule is mapped onto its functional units. The second is the outcome of this CBNZ instruction 105, indicating whether the branch prediction on the basis of which speculative execution continued was in fact correct. Accordingly when the corresponding instruction schedule is mapped onto its functional units the Speculation_Valid_Signal will be generated as an output.

Figure 4:
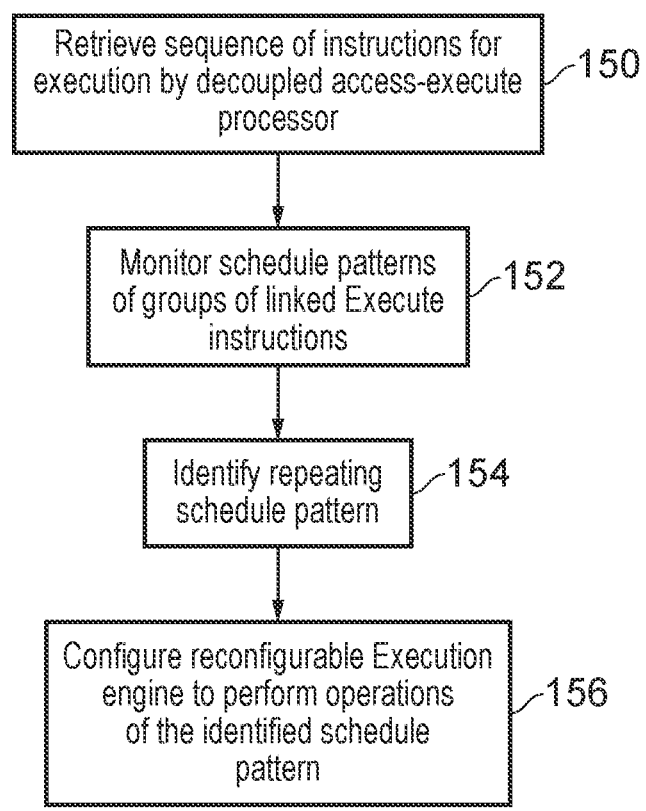

FIG. 4 is a flow diagram showing a sequence of steps which are taken according to the method of some embodiments. The general procedure according to which repeating instruction schedule patterns are identified and on the basis of which reconfigurable execution circuitry is configured is shown. The flow begins at step 150 where a sequence of instructions for execution by a decoupled access-execute processor are retrieved. As this sequence of instructions is executed at step 152 its schedule patterns are monitored, and in particular the schedule patterns of groups of linked execute instructions are monitored. Then at step 154 a repeating schedule pattern (of such linked execute instructions) is identified. Finally at step 156 the reconfigurable execution engine is configured to perform the operations of the identified schedule pattern.

Figure 5:
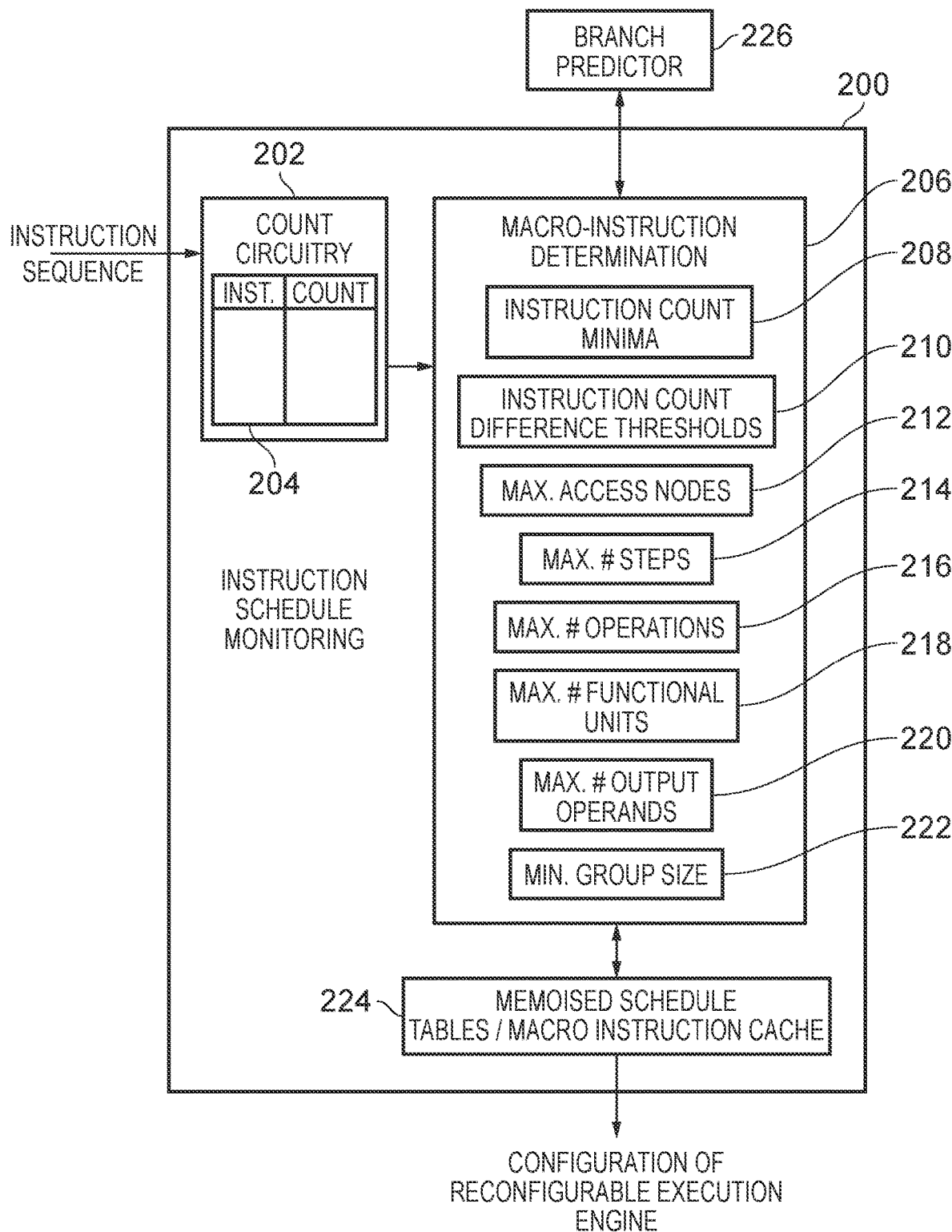

FIG. 5 schematically illustrates instruction schedule monitoring circuitry 200 according to some embodiments. Indications of the sequence of instructions to be executed are received by the instruction schedule monitoring circuitry 200 and firstly received within the instruction schedule monitoring circuitry 200 by count circuitry 202. The count circuitry 202 is arranged to maintain iteration counts of instructions within the instruction sequence which it does by maintaining a cache-like instruction count storage 204, in which commonly encountered instructions and their current iteration counts are maintained. Information relating to these counted instructions is passed to the macro-instruction determination unit 206. As mentioned above with reference to FIG. 3 initial sets of instructions to begin a dataflow graph elaboration are identified on the basis of their instruction counts. More particularly in order to identify the primary nodes for a dataflow graph, access instructions which directly produce values consumed by execute instructions and which have similar iteration counts are identified. Such a set of access instructions must not only have similar iteration counts, but those counts must also be above a predefined minimum. The macro-instruction determination unit 206 holds various values which configure how it operates and one of these comprises a set of instruction count minima 208. Similarly when execute instructions in the sensitivity list of the identified primary node access instructions are to be identified this is also done on the basis of a similar iteration count and also where that iteration count must be above a predefined minimum. The degree of similarity between instruction counts required is defined by a set of instruction count difference thresholds 210. A further constraint on the identification of the primary nodes that the dataflow graph is provided by a predetermined value held by the macro-instruction determination unit 206 as the maximum number of access nodes 212 which may be identified as primary nodes. The macro-instruction determination unit 206 carries out the process described above with respect to FIG. 3 and as described below with reference to FIGS. 8A-8C. Further predetermined values which the macro-instruction determination unit 206 holds in order to configure its operation are held as the maximum number of iteration steps 214 (of the iterative dataflow graph elaboration procedure), the maximum number of operations 216 (i.e. the maximum number of total operations found within the dataflow graph), the maximum number of functional units 218 (i.e. the capacity of the reconfigurable execution engine), the maximum number of output operands 220, and a minimum group size 222 (i.e. a minimum number of linked execute instructions for which establishment of the macro instruction is considered worthwhile). The macro instruction determination unit 206 can also access branch predictor 226, to derive a branch prediction for a branch instruction within a dataflow graph which is elaborating. The instruction schedule monitoring circuitry 200 is further shown to comprise memorised schedule tables/macro-instruction cache 224, in which the macro instruction determination circuitry 206 can build up and store memorised schedules and (components of) macro instructions. An example memorised schedule in an embodiment where instructions in a macro-instruction are mapped to unique functional units with unique node identifiers in a one-to-one fashion is shown below in Table 1, corresponding to the dataflow graph shown in FIG. 3. The "_x" suffixes are used to indicate the port of the functional unit being addressed. The respective configurations for the functional units can then be provided as an output of the instruction schedule monitoring unit 200 to pass to the reconfigurable execution engine to configure its functional units accordingly.

TABLE 1

| Depth | Operation | Instruction Address | Node # | Target(s) |
|---|---|---|---|---|
| D_1 | ADD | 0x80C | 1 | 4_1 |
| D_1 | ADD | 0x810 | 2 | 4_2 |
| D_1 | MNEG | 0x81C | 3 | 7_2 |
| D_2 | SUB | 0x820 | 4 | 6_1, 5_2 |
| D_3 | CBNZ | 0x828 | 5 | Speculation_Valid_Signal |
| D_3 | EOR | 0x830 | 6 | 7_1 |
| D_4 | MUL | 0x834 | 7 | 8_2, 9_1 |
| D_5 | STR | 0x838 | 8 | — |
| D_5 | LSL | 0x840 | 9 | Phys_Reg_X |

When the macro-instruction determination circuitry 206 builds up content in the memorised schedule tables/macro-instruction cache 224, this can not only be used for the specification of a macro-instruction, but it can also be used for reference when determining a new instruction schedule, whereby the macro instruction determination circuitry 206 can reuse the configurations established even for subsets of groups of linked instructions to save reconstructing these afresh. A macro-instruction may be defined with the format:

|<MID>|<OUT>|<IN>|<Bconsts>|<SpecValid>| where <MID>=Macro-instruction ID; <OUT>=output architectural registers; <IN>=input architectural registers; <Bconsts>=input constant representing branch outcomes; and <SpecValid>=speculation valid signal. Thus defined the new macro-instruction may be treated like other instructions passing through the execution pipeline, including being renamed, where the input and output architectural registers are mapped onto available physical registers.

Figure 6:
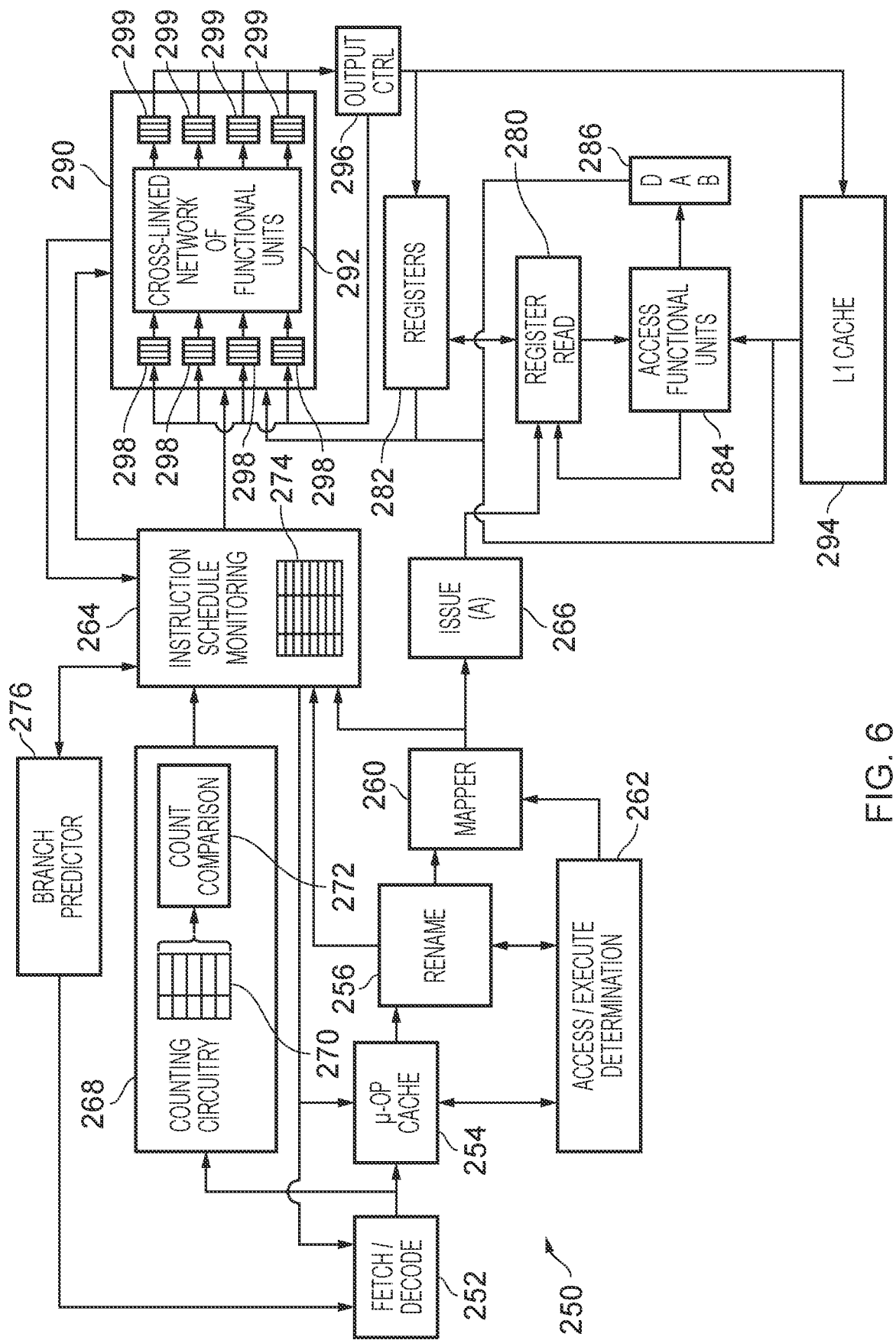

FIG. 6 schematically illustrates a data processing apparatus 250 according to some embodiments. As in the case of the apparatuses of FIG. 1 and FIG. 2, a pipelined configuration is shown beginning with fetch/decode circuitry 252. The further initial stages of the pipeline shown are represented as the micro-op (μ-op) cache 254, the rename circuitry 256, and the mapper stage 260. An additional component associated with the micro-op cache 254 and the rename circuitry 256 is the access/execute determination circuitry 262. This circuitry is provided to determine on-the-fly whether instructions should be characterised as access or execute. Once they have been categorised instructions may be labelled in the micro-op cache 254 by type, such that the determination does not need repeating. The association with the rename circuitry 256 enables the access/execute determination circuitry 262 to take into account data dependencies between instructions, since these may affect an instruction's categorisation (for example an arithmetic instruction which provides a value which is subsequently used by a load instruction as one of its operands is itself an access instruction). The mapper stage 260 forwards instructions for execution dependent on their categorisation. Execute instructions are passed to the instruction schedule monitoring circuitry 264, whilst access instructions are passed to the access issue circuitry 266. In the example of FIG. 3, counting circuitry 268 is also shown, which is provided with indications of all instructions to be executed from the output of the fetch/decode stage 252. The counting circuitry 268 comprises instruction count table 270 and count comparison circuitry 272. Iteration counts of both access and execute instructions are maintained in the instruction count table 270 and these are compared by the count comparison circuitry 272. Indications of groups of access instructions with similar iteration counts and groups of execution instructions with similar iteration counts are passed to the instruction schedule monitoring circuitry 264. The instruction schedule monitoring circuitry 264 further comprises instruction schedule table/macro-instruction cache 274, which may for example be used maintained in a similar manner to the structure 224 discussed with reference to FIG. 5. Instruction schedule monitoring circuitry 264 further has access to the branch predictor 276 in order to gain branch predictions with respect to branch instructions which it encounters within a dataflow graph under elaboration. The branch predictor 276 also provides output to the fetch circuitry of the fetch/decode stage 252, in order to steer the sequence of instruction fetches when required. The data processing apparatus 250 operates in accordance with the decoupled access-execute paradigm and therefore access issue circuitry 266 is arranged to issue access instructions for execution as early as possible, wherein the example illustration of FIG. 6 the access instructions are shown first passed to a register read stage 280. The register read stage 280 accesses the physical registers 282 of the apparatus and thus provides the access functional unit 284 not only with indications of the operations which they should carry out but also with any required values retrieved from the registers 282. As before, noting that access instructions not only comprise load instructions themselves, but also other instructions which provide (directly or indirectly) values used by the load instructions, the functional units 284 comprise not only load units which are arranged to cause data values to be retrieved from memory, but also further arithmetic and logical units required to support the execution of the access instructions which are not themselves load instructions. The data values retrieved from memory by the action of the access functional units 284 are stored in the decoupled access-execute buffer (DAB) 286, which is provided specifically for the purpose of holding values retrieved by the access phase and required by the execute phase of this decoupled access-execute processor. Accordingly the DAB 286 is shown in FIG. 6 as providing an input to the reconfigurable execution engine 290. The instruction schedule monitoring circuitry 264 receives indications of instruction counts from the count comparison circuitry 272 of the counting circuitry 268 and on the basis of groups of instructions which have similar iteration counts seeks to identify groups of linked execute instructions which have a repeating schedule pattern. The instruction schedule monitoring circuitry 264 also receives inputs from the rename stage 256, from the branch predictor 276, and from the reconfigurable execution engine 290. The input from the branch predictor 276 provides the instruction schedule monitoring circuitry 264 with a branch prediction for one or more branch instructions which it encounters within a group of linked execute instructions enabling it to proceed with elaborating such a group on the basis of the assumed direction(s) that the branch instruction(s) will take. When such an assumption is made, and the reconfigurable execution engine 290 subsequently proceeds with speculative instruction execution on the basis of that branch prediction, the reconfigurable execution engine 290 can provide the instruction schedule monitoring circuitry 264 with information regarding the outcome of that speculation (i.e.

whether or not the branch prediction was correct). The reconfigurable execution engine 290 is shown in FIG. 6 to comprise a cross-linked network of functional units 292. More detail of the example configuration of this cross-linked network of functional units is described below with reference to FIGS. 7A and 7B. When the instruction schedule monitoring circuitry 264 has established a configuration which the reconfigurable execution engine 290 should adopt this is passed to the reconfigurable execution engine 290 and causes each of some or all of the functional units 292 to adopt a particular configuration. Input data for the cross-linked network of functional units 292 can be received from the registers 282, from the DAB 286, from the L1 cache 294, or as feedback from its own outputs. The outputs of the reconfigurable execution engine 290 are controlled by the output control 296, which either directs such output as feedback to the inputs of the reconfigurable execution engine or for storage in the L1 cache 294. Data which is provided as inputs to the cross-linked network of functional units 292 is buffered in a set of input FIFOs 298. Data which is generated as outputs of the cross-linked network of functional units 292 is buffered in a set of output FIFOs 299. Outputs from the instruction schedule circuitry 264, in particular in the form of macro-instruction definitions which are created, are received by the fetch/decode stage 252 and the micro-op cache 254. This enables the instruction schedule monitoring circuitry 264 to identify a group of linked execute instructions which have a repeating schedule pattern and to define a corresponding macro-instruction which can then be substituted into the sequence of instructions which the data processing apparatus 250 receives. Such a substituted macro-instruction can then be handled by the pipeline stages in much the same way as an original program instruction, including for example being renamed by the rename stage 256 and the input from the rename stage 256 enables the rename stage 256 to signal to the instruction schedule monitoring circuitry 264 when this has taken place.

Figure 7A:
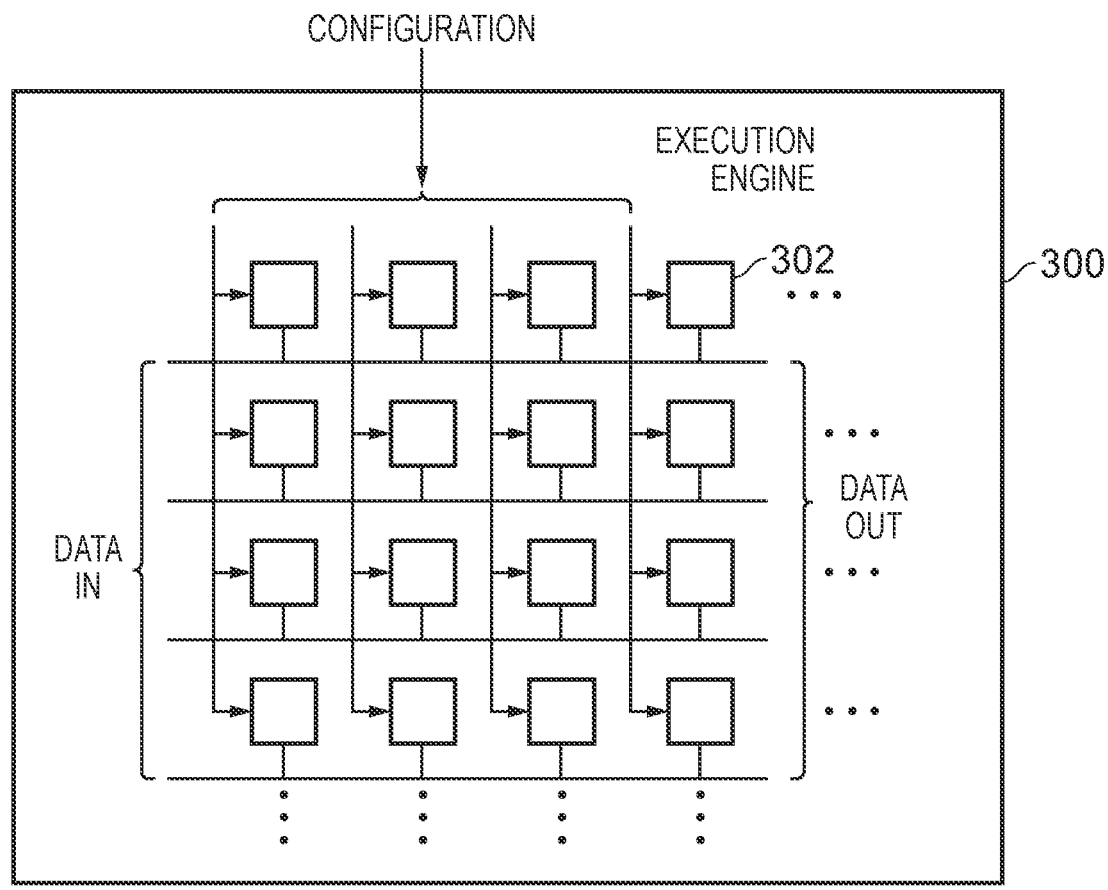
Figure 7B:
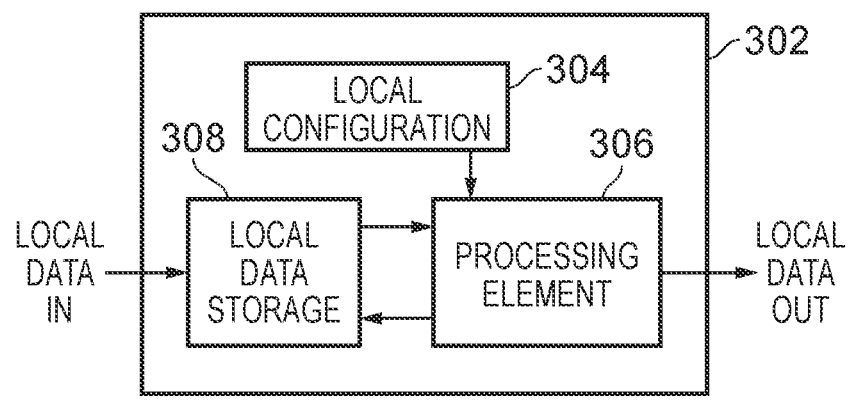

FIG. 7A schematically illustrates this a reconfigurable execution engine 300 comprising a cross-linked network of functional units according to some embodiments. Sixteen functional units 302 are explicitly shown in FIG. 7A, but this number of functional units may vary considerably and the ellipses (" . . . ") in FIG. 7A indicate that the number of functional units may be arbitrary extended. In the example shown, configuration paths run vertically and allow each functional unit to be provided with an individual configuration, whilst data paths run horizontally and allow data to reach each functional unit—either as input data provide to the execution engine or as internal data transferred from one functional unit to another. The data paths also allow data generated result of the data processing performed by each functional unit to be output. FIG. 7B schematically illustrates an example configuration of a functional unit 302. This functional unit 302 comprises local configuration storage 304 which holds configurational values which determine the data processing which the functional unit performs. These configurational values steer the operation of the processing element 386 which carries out the data processing. Local data storage 308 is also provided into which the data for this functional unit can be written and which the processing elements 306 accesses in order to perform its data processing. The processing elements 306 can also output local data, either for passing to another functional unit of the execution engine or for output from the execution engine. The set of functional units may take a variety of forms and in some embodiments comprise a coarse grained reconfigurable array. In other embodiments comprise a field-programmable gate array. Still further embodiments may be provided in which the reconfigurable execution engine is provided by a very-long-instruction-word architecture.

Figure 8A:
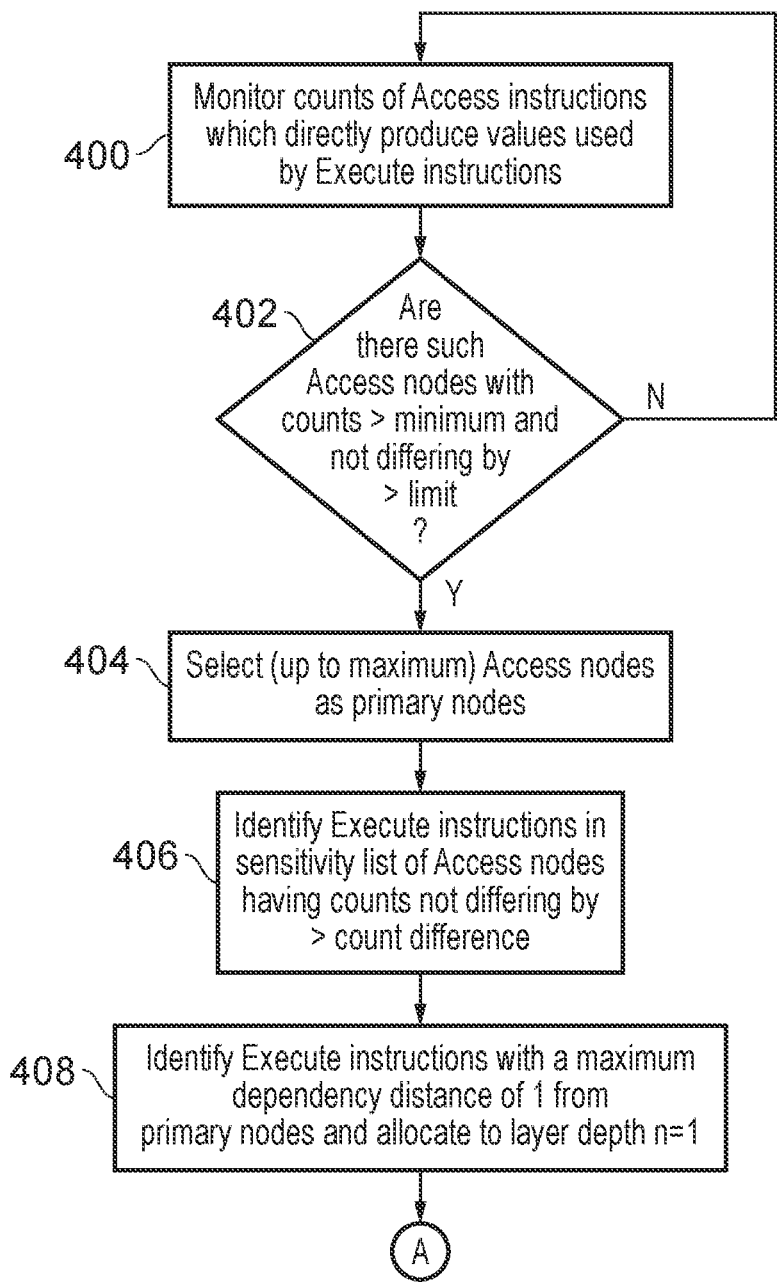
Figure 8B:
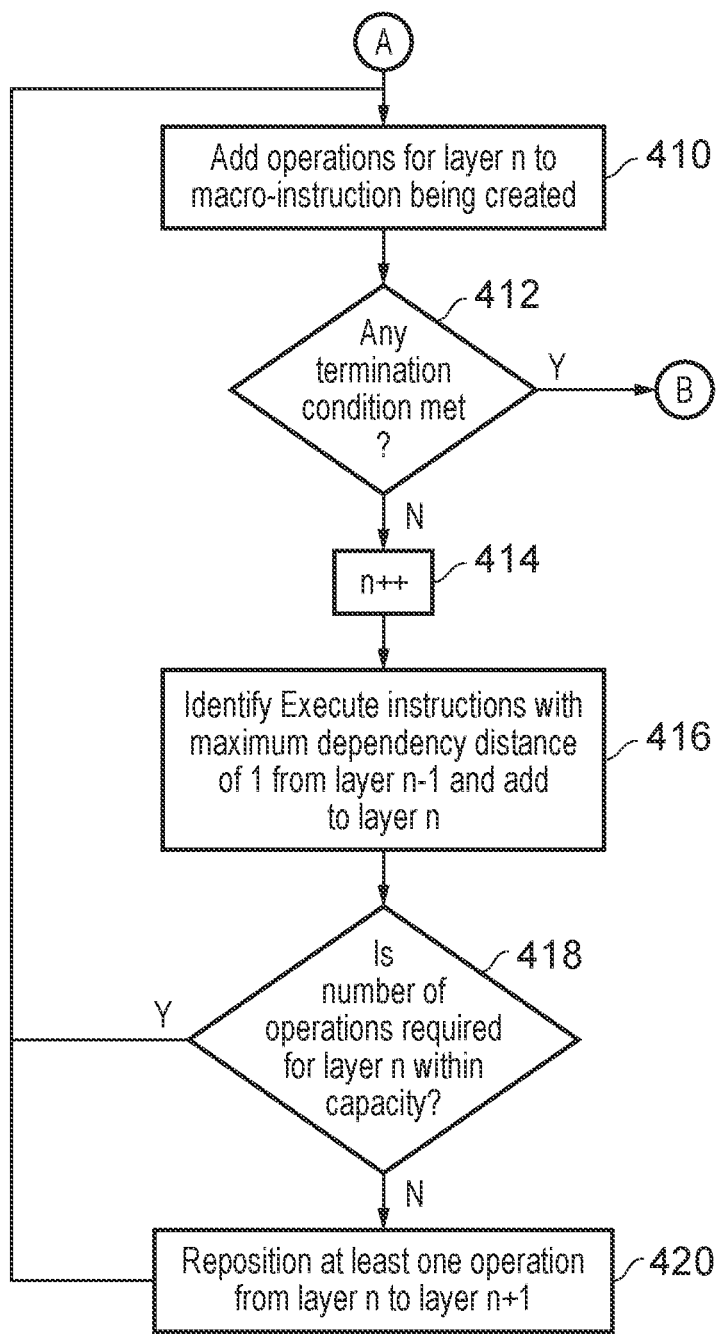
Figure 8C:
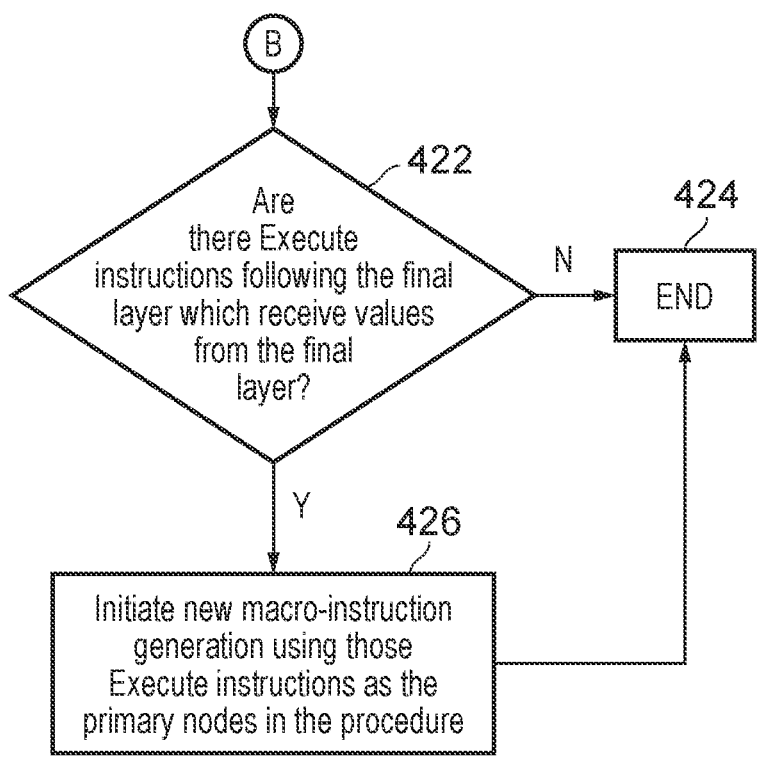

FIGS. 8A, 8B, and 8C are a flow diagram showing a sequence of steps which are taken according to the method of some embodiments. The steps begin at step 400, where the counts of access instructions which directly produce values by execute instructions are monitored. It is then determined at step 402 whether there are any such access nodes which have counts above a predefined minimum and not differing from one another by more than a predefined limit. When this is not the case the flow returns to step 400 for the monitoring to continue. When the condition at step 402 is satisfied, the flow proceeds to step 404 where those access nodes (up to a predefined maximum number) are selected to be the primary nodes for the dataflow graph elaboration procedure. Then at step 406 execute instructions in the sensitivity list of those access nodes are identified which have counts not differing from the counts of the access nodes by more than a predefined difference. At step 408, from those execute instructions found to be in the sensitivity list of the access nodes, execute instructions with a maximum dependent distance of one from the primary nodes are identified and these are allocated to layer depth n=1. Then at step 410 operations for the layer n (i.e. in the first iteration for layer n=1) are added to the macro instruction being created. At step 412 it is then determined if any termination condition is met. Various conditions relating to the data flow graph elaboration procedure may terminate it and these are described in more detail below. However while no termination condition is met flow proceeds to step 414, where n is incremented. Then at step 416, from the execute instructions identified step for 6 to be in the sensitivity list of the access nodes, execute instructions with a maximum dependency distance of 1 from layer n–1 are identified and added to layer n. Next at step 418 it is determined the number of operations required for layer n is within the capacity the reconfigurable execute engine. If it is then the flow returns to step 410. It is not then at step 420 at least one operation from layer n is repositioned to layer n+1 and the flow then returns to step 410. Returning to a consideration of step 412, when any termination condition is found to be met the flow proceeds to step 422. Here the possible termination conditions are that: a predefined maximum number of steps (layers) for the sequence of steps (layers) has been reached; a predefined maximum number of operations (in total) for the group of linked execute instructions of the repeating schedule pattern has been reached; a predefined maximum number of functional units of the configurable execution circuitry required to be used has been reached; a predefined maximum number of output operands for the operations defined by the macro-instruction under construction has been reached; a store step (layer) has been reached at which the candidate execute instructions (at that layer) comprise only store instructions; or a layer has been reached which comprises at least one data-dependent branch instruction. At step 422, although elaboration of the current macro instruction has terminated, it is determined if there are any execute instructions which follow the final layer which receive values from the final layer. When this is not the case then the flow concludes at step 424. However when this is the case the flow proceeds to step 426 which initiates a new macro-instruction generation procedure using those execute instructions identified at step 422 as the primary nodes in the new procedure. The flow then concludes at step 424.

Figure 9A:
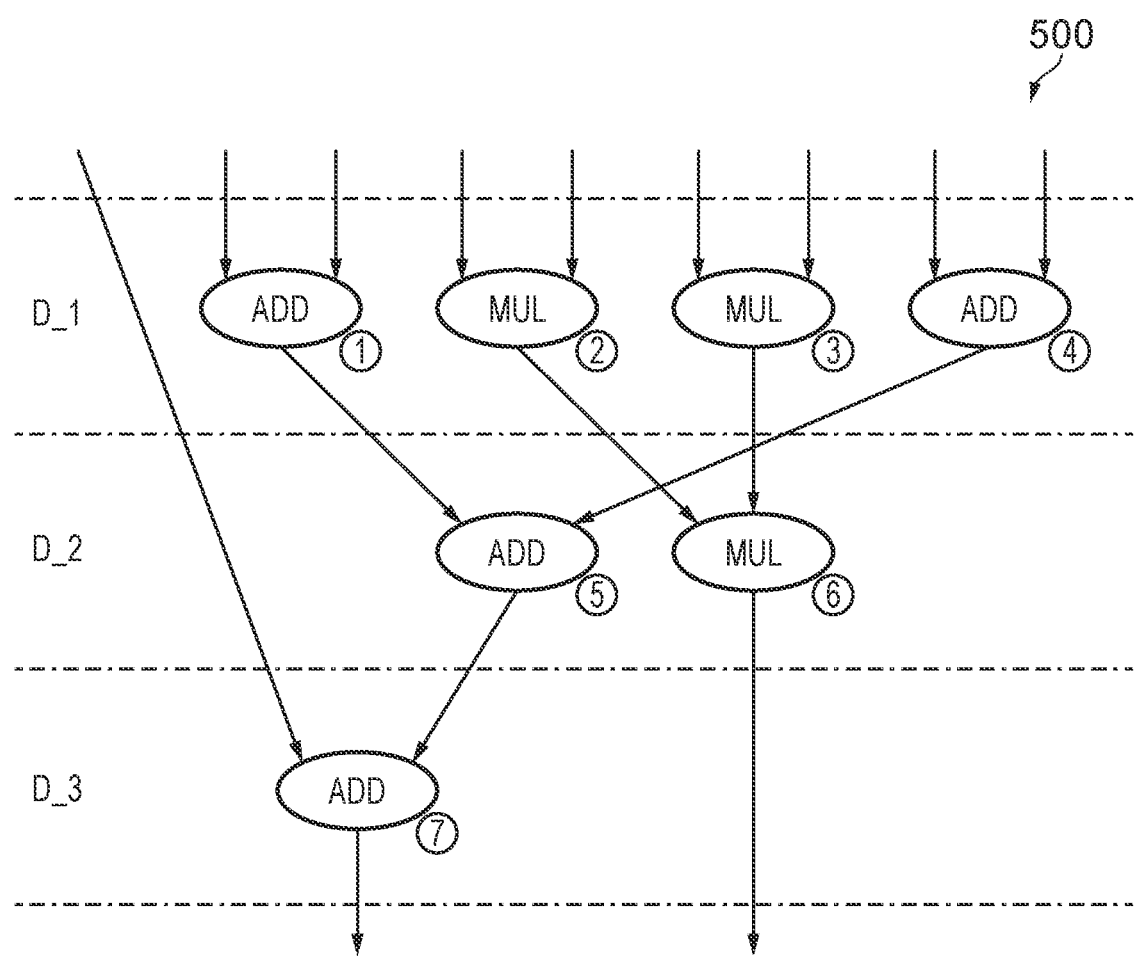
FIGS. 9A and 9B illustrate the manner in which an operation may be repositioned in a sequence of operational steps to allow for functional unit capacity according to some embodiments.
Figure 9B:
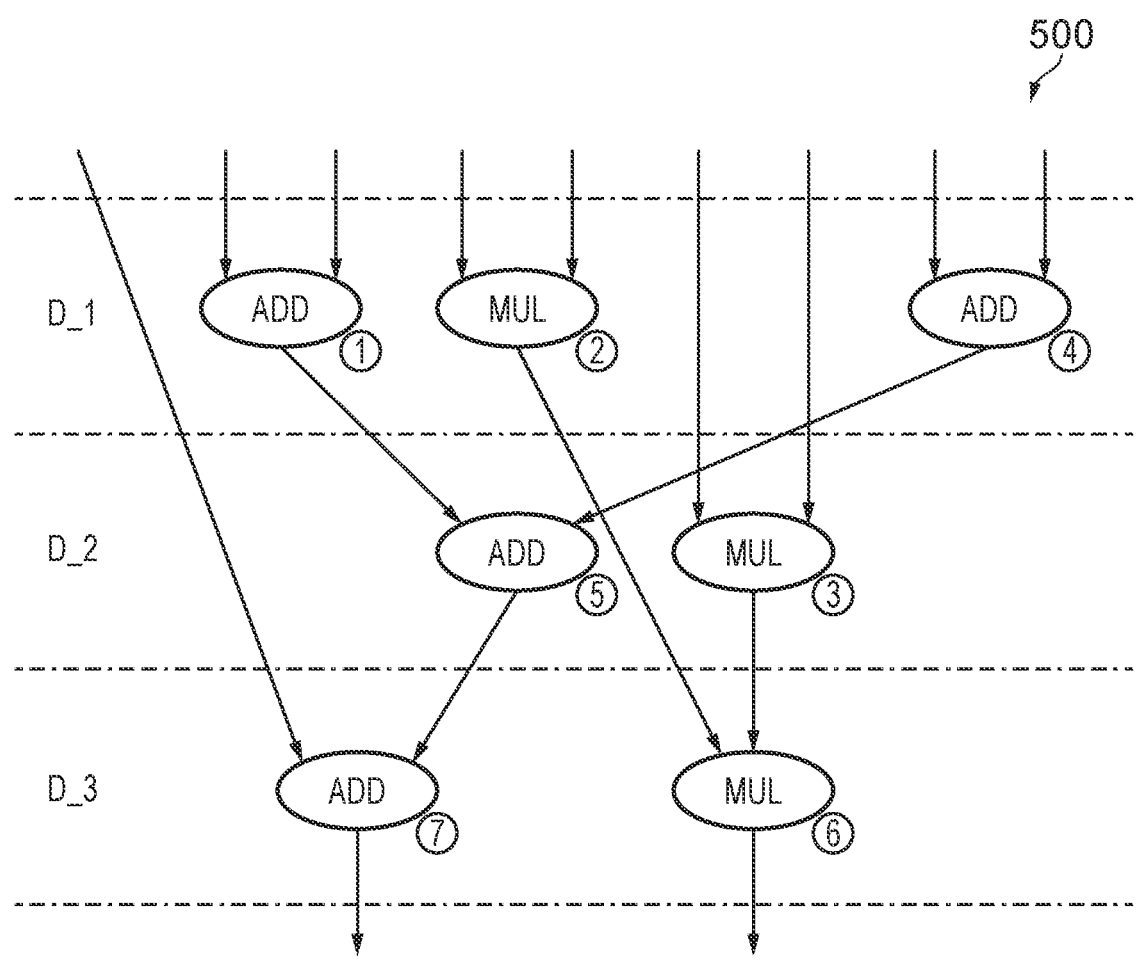

FIGS. 9A and 9B illustrate the manner in which an operation may be repositioned in a sequence of operational steps to allow for functional unit capacity according to some embodiments. A portion of a dataflow graph 500 is shown, which is mapped onto three layers (according to the iterative dataflow graph elaboration procedure described herein) of an instruction schedule. In FIG. 9A four operations are scheduled in layer 1, two operations are scheduled in layer 2, and one operation is scheduled in layer 3. This however is determined to exceed the bandwidth capacity of functional units of the reconfigurable execution engine, in that it does not have the capacity to perform the two MUL operations scheduled in layer 1 concurrently. Note that in other embodiments the reconfigurable execution engine could have the capacity to concurrently execute more than one MUL operation concurrently, but this example is used here for clarity and brevity. In response to this situation the instruction schedule monitoring circuitry repositions one of the MUL operations into a later layer of the schedule, such that the MUL execution bandwidth capacity of the functional units of the reconfigurable execution engine is not exceeded. Thus, as shown in FIG. 9B, the second MUL operation is moved to layer D_2, leaving only one MUL operation in layer D_1. Further the delaying of the second MUL operation to layer D_2 of the schedule also causes the third MUL operation, which takes its inputs from each of the first and second MUL operations, to itself then be delayed in the schedule to layer D_3. Note that in doing this the dataflow graph 500 still remains the same and it is only the schedule which is adjusted in order to account for the execution capacity of functional units of the reconfigurable execution engine.

Figure 10:
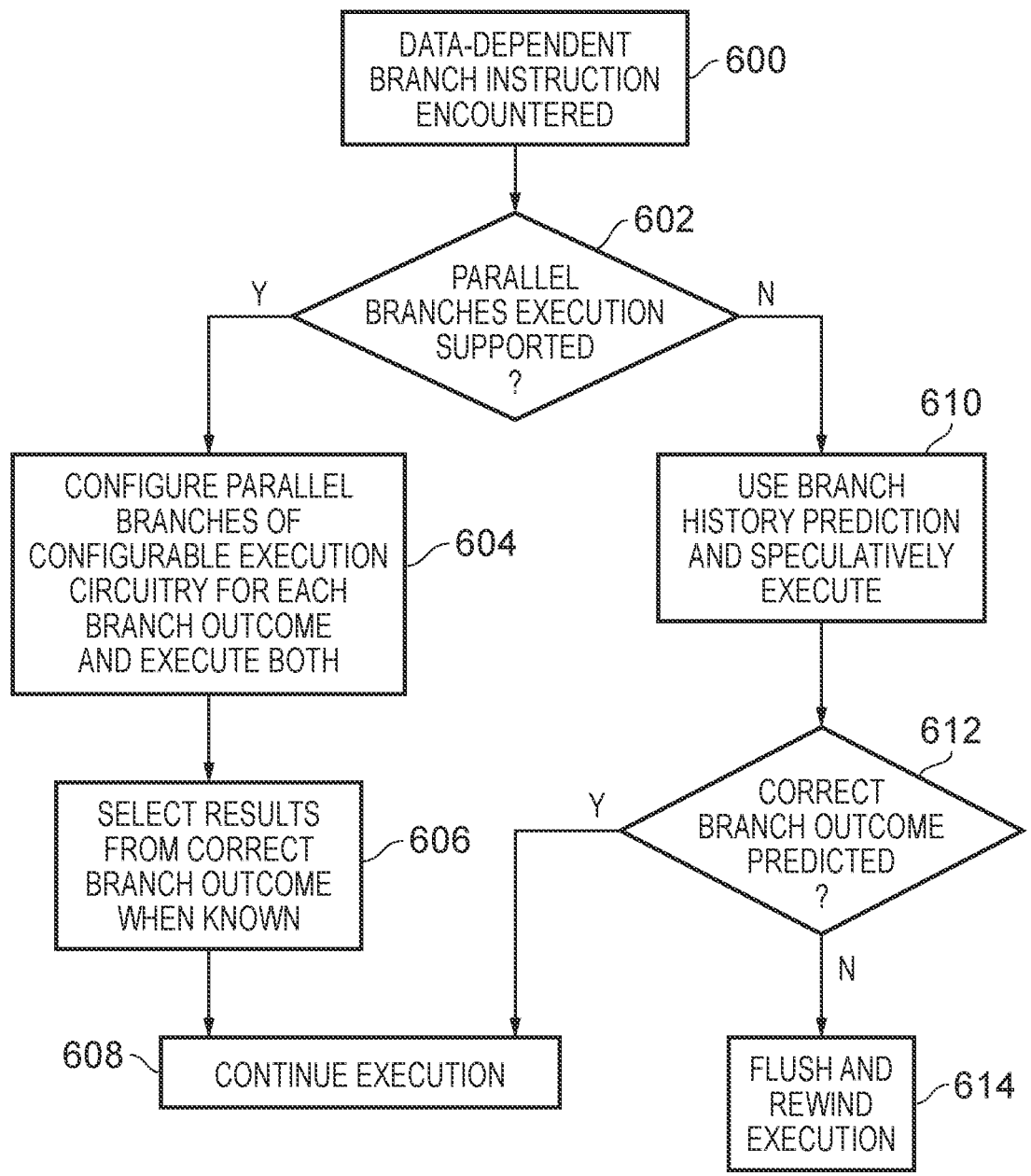
FIG. 10 is a flow diagram showing a sequence of steps which are taken according to the method of some embodiments.

FIG. 10 is a flow diagram showing a sequence of steps which are taken according to the method of some embodiments. In particular the sequence of steps illustrates the manner in which the system may respond to a data-dependent branch instruction being encountered in the group of linked execute instructions. Such a data-dependent branch instruction is identified step 600. At step 602 it is then determined whether the parallel execution of alternative branch outcomes is supported. When it is supported the flow proceeds to step 604, where separate parts of the reconfigurable execution engine are configured to execute the sequence of operations corresponding to each respective branch outcome. Each sequence of operations then executed in parallel and at step 606 the results from the correct branch outcome are selected once it is known what that correct branch outcome should be. Further instruction execution continues at step 608. Conversely if it is determined at step 602 that the parallel execution of alternative branch outcomes is not supported the flow proceeds to step 610 where branch prediction is used to select an assumed branch outcome. Speculative execution then continues on the basis of that predicted outcome. Then at step 612 it is determined whether the speculative execution was correct, i.e. whether the predicted branch outcome was correct. When it was further instruction execution simply continues at step 608. However when it is found that the branch prediction was incorrect then the flow proceeds to step 614, where the pipeline is correspondingly flushed and execution is rewound, in order to re-execute the sequence of instructions following the correct branch outcome.

Figure 11:
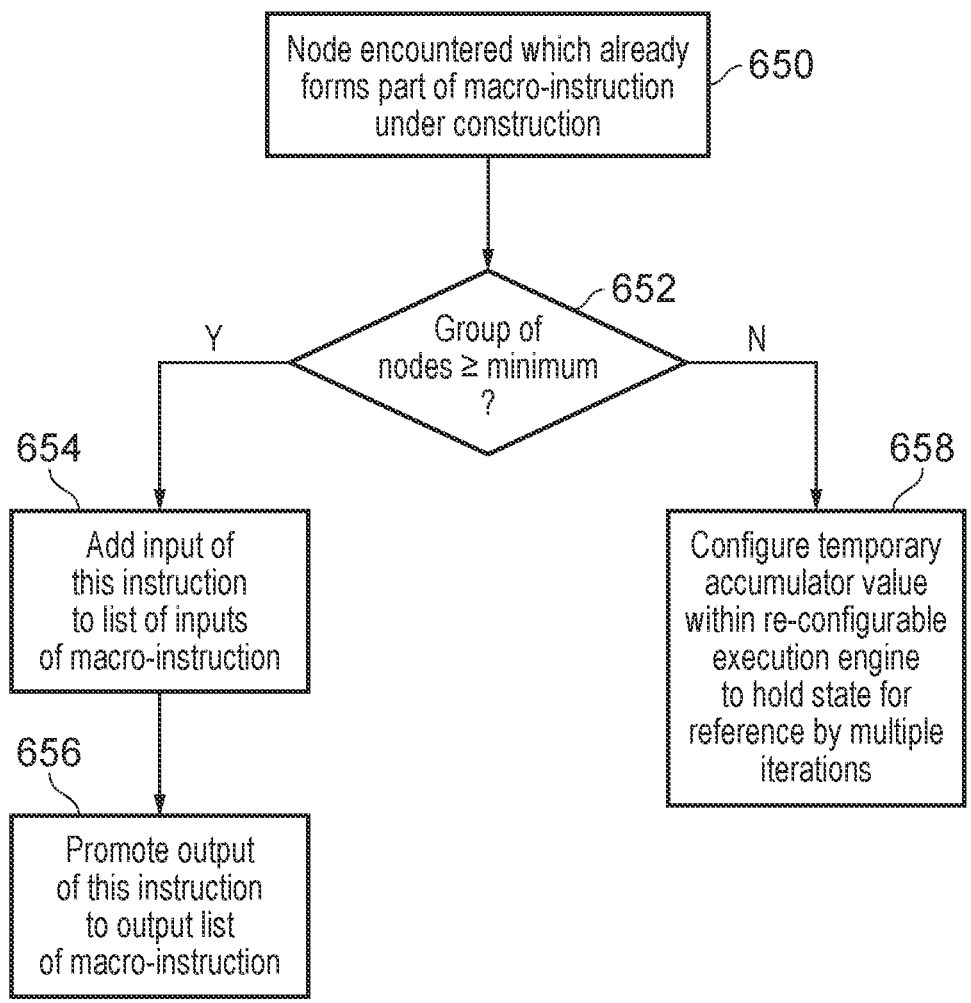
FIG. 11 is a flow diagram showing a sequence of steps which are taken according to the method of some embodiments.

FIG. 11 is a flow diagram showing a sequence of steps which are taken according to the method of some embodiments. This sequence of steps considers the situation, shown at step 605, in which during macro-instruction construction by means of the iterative dataflow graph elaboration procedure a node is encountered which already forms part of the macro-instruction under construction. It is then firstly determined at step 652 whether the current group of nodes is more than a predefined minimum. When this is the case the flow proceeds to step 654, where the input of this instruction is added to the list of inputs of the macro instruction. Then at step 656 the output of this instruction is promoted to the output list of the macro instruction. Conversely, if it is determined at step 652 that the group of nodes is not greater than or equal to the predefined minimum number, the flow proceeds to step 658 where a temporary accumulator value is configured within the reconfigurable execution engine to hold state for reference by multiple iterations of this instruction. Further steps of the iterative dataflow graph elaboration procedure can then continue (regardless of which branch was taken from step 652).

The following numbered clauses set out various example configurations:

Clause 1. Apparatus comprising:
  instruction fetch circuitry to retrieve a sequence of instructions, wherein the sequence of instructions comprises access instructions and execute instructions, wherein the access instructions comprise load instructions and instructions which provide operand values to load instructions;
  decoupled access-execute processing circuitry comprising access instruction processing circuitry to handle the access instructions and execute instruction processing circuitry to handle the execute instructions, wherein the access instruction processing circuitry is capable of executing the access instructions out of program order with respect to the execute instructions, and wherein the execute instruction processing circuitry is capable of executing the execute instructions out of program order;
  instruction schedule monitoring circuitry to monitor schedule patterns of groups of linked execute instructions, wherein the execute instructions in a group of linked execute instructions are linked by data dependencies, and to identify a repeating schedule pattern which repeats when the sequence of instructions is executed; and
  configurable execution circuitry responsive to identification of the repeating schedule pattern to adopt a configuration to perform operations defined by the group of linked execute instructions of the repeating schedule pattern.

Clause 2. The apparatus as defined in clause 1, further comprising instruction counting circuitry to maintain count values of instances of the access instructions and the execute instructions encountered in the sequence of instructions,
  wherein the instruction schedule monitoring circuitry is arranged to identify the groups of linked execute instructions using an iterative dataflow graph elaboration procedure,
  and wherein the instruction schedule monitoring circuitry is arranged to identify a set of access instructions as primary nodes for the iterative dataflow graph elaboration procedure based on the access instructions of the set of access instructions having count values in the instruction counting circuitry which are greater than an instruction count minimum and which differ by less than a threshold access instruction count difference.

Clause 3. The apparatus as defined in clause 2, wherein the instruction schedule monitoring circuitry is arranged to identify up to a predetermined maximum number of access instructions for the set of access instructions identified as primary nodes for the iterative dataflow graph elaboration procedure.

Clause 4. The apparatus as defined in clause 2, wherein the instruction schedule monitoring circuitry is arranged to perform the iterative dataflow graph elaboration procedure comprising:

identifying candidate execute instructions for a candidate group of linked execute instructions, wherein the candidate execute instructions have one or more inputs which depend on result values of the set of access instructions identified as primary nodes, and wherein the candidate execute instructions have count values in the instruction counting circuitry which differ by less than a threshold execute instruction count difference from the count values of the set of access instructions.

Clause 5. The apparatus as defined in clause 4, wherein the instruction schedule monitoring circuitry is arranged to perform the iterative dataflow graph elaboration procedure in a sequence of steps, wherein at a first step of the sequence of steps one or more first step execute instructions of the candidate execute instructions are identified, wherein the one or more first step execute instructions have one or more inputs which directly depend without intermediary on result values of the set of access instructions identified as primary nodes, and wherein at a subsequent step of the sequence of steps one or more subsequent execute instructions of the candidate execute instructions are identified, wherein the one or more subsequent step execute instructions have one or more inputs which directly depend without intermediary on result values of the one or more first step execute instructions.

Clause 6. The apparatus as defined in clause 5, wherein at each further step of the sequence of steps one or more further execute instructions of the candidate execute instructions are identified, wherein the one or more further execute instructions have one or more inputs which directly depend without intermediary on result values of one or more execute instructions at an immediately preceding step.

Clause 7. The apparatus as defined in clause 5, wherein the instruction schedule monitoring circuitry is arranged to terminate the iterative dataflow graph elaboration procedure on reaching a predetermined maximum number of steps for the sequence of steps.

Clause 8. The apparatus as defined in clause 5, wherein the instruction schedule monitoring circuitry is arranged to terminate the iterative dataflow graph elaboration procedure on reaching a predetermined maximum number of operations for the group of linked execute instructions of the repeating schedule pattern.

Clause 9. The apparatus as defined in clause 5, wherein the instruction schedule monitoring circuitry is arranged to terminate the iterative dataflow graph elaboration procedure on reaching a predetermined maximum number of functional units of the configurable execution circuitry required to be used in the configuration to perform the operations defined by the group of linked execute instructions of the repeating schedule pattern.

Clause 10. The apparatus as defined in clause 5, wherein the instruction schedule monitoring circuitry is arranged to terminate the iterative dataflow graph elaboration procedure on reaching a predetermined maximum number of output operands for the operations defined by the group of linked execute instructions of the repeating schedule pattern.

Clause 11. The apparatus as defined in clause 5, wherein the instruction schedule monitoring circuitry is arranged to terminate the iterative dataflow graph elaboration procedure on reaching a store step of the sequence of steps at which the candidate execute instructions comprise only store instructions.

Clause 12. The apparatus as defined in clause 5, wherein the instruction schedule monitoring circuitry is arranged to terminate the iterative dataflow graph elaboration procedure on reaching a branch step of the sequence of steps at which the candidate execute instructions comprise at least one data-dependent branch instruction.

Clause 13. The apparatus as defined in clause 5, wherein, on reaching a branch step of the sequence of steps at which the candidate execute instructions comprise at least one data-dependent branch instruction, the instruction schedule monitoring circuitry is arranged to cause the configuration adopted by the configurable execution circuitry to comprise at least one branch outcome input indicative of a currently prevailing outcome of the at least one data-dependent branch instruction, wherein the at least one branch outcome input will cause the configurable execution circuitry to speculatively perform the operations defined by the group of linked execute instructions of the repeating schedule pattern based on the at least one branch outcome input.

Clause 14. The apparatus as defined in clause 5, wherein, on reaching a branch step of the sequence of steps at which the candidate execute instructions comprise at least one data-dependent branch, the instruction schedule monitoring circuitry is arranged to cause the configurable execution circuitry to adopt a parallelized configuration to perform at least two parallel versions of the operations defined by the group of linked execute instructions of the repeating schedule pattern, wherein the at least two parallel versions of the operations assume different outcomes of the at least one data-dependent branch instruction, and wherein the apparatus is arranged to select between result values of the at least two parallel versions of the operations after an outcome of the at least one data-dependent branch instruction is known.

Clause 15. The apparatus as defined in clause 5, wherein the instruction schedule monitoring circuitry is responsive to the iterative dataflow graph elaboration procedure being terminated at a final step of the sequence of steps:

to determine whether there are following execute instructions of the candidate execute instructions which receive values from the execute instructions of the final step of the sequence of steps, and when there are said following execute instructions to use the following execute instructions as new primary nodes for a new iterative dataflow graph elaboration procedure.

Clause 16. The apparatus as defined in clause 5, wherein the instruction schedule monitoring circuitry is responsive to a required number of operations at a current step of the sequence of steps exceeding a capacity of the configurable execution circuitry by repositioning at least one operation of the current step into a subsequent step of the sequence of steps.

Clause 17. The apparatus as defined in clause 2, wherein the instruction schedule monitoring circuitry is arranged to create a macro-instruction to substitute for the group of linked execute instructions of the repeating schedule pattern.

Clause 18. The apparatus as defined in clause 17, wherein during further execution of the sequence of instructions substitution of the macro-instruction for the group of linked execute instructions of the repeating schedule pattern is dependent on updates for count values of the execute instructions of the group of linked execute instructions of the repeating schedule pattern not differing from one another.

Clause 19. The apparatus as defined in clause 17, further comprising a set of primary node result FIFO buffers, wherein the configuration adopted by the configurable execution circuitry comprises arranging that result values of the set of access instructions identified as primary nodes provide inputs to the set of primary node result FIFO buffers, and outputs of the set of primary node result FIFO buffers provide input operands for the macro-instruction.

Clause 20. The apparatus as defined in clause 17, further comprising a set of macro-instruction result FIFO buffers, wherein the configuration adopted by the configurable execution circuitry comprises arranging that one or more result values of the macro-instruction provide inputs to the set of macro-instruction result FIFO buffers.

Clause 21. The apparatus as defined in clause 20, wherein the outputs of the set of macro-instruction result FIFO buffers provide inputs to one or more physical registers onto which one or more architectural registers specified as destinations of the one or more result values of the macro-instruction have been mapped.

Clause 22. The apparatus as defined in clause 17, wherein the configurable execution circuitry comprises at least one result feedback path leading from an output of the configurable execution circuitry to an input of the configurable execution circuitry, and wherein the configuration adopted by the configurable execution circuitry comprises arranging that at least one result value of the macro-instruction is provided via the at least one result feedback path to at least one input of the configurable execution circuitry.

Clause 23. The apparatus as defined in clause 17, further comprising register renaming circuitry to perform register renaming for execute instructions to map architectural registers specified in the execute instructions onto physical registers, wherein locations of input operands for the macro-instruction and one or more result values of the macro-instruction are defined with reference to the architectural registers, and wherein the register renaming circuitry is arranged to perform the register renaming for the macro-instruction.

Clause 24. The apparatus as defined in clause 17, further comprising macro-instruction cache storage to temporarily store entries for macro-instructions created by the instruction schedule monitoring circuitry, wherein each entry comprises an indication of the group of linked execute instructions of the repeating schedule pattern,
and the instruction schedule monitoring circuitry is arranged to reference the macro-instruction cache storage when performing the iterative dataflow graph elaboration procedure in order to reuse a portion of the configuration for the configurable execution circuitry generated by a previously created macro-instruction.

Clause 25. The apparatus as defined in clause 2, wherein the instruction schedule monitoring circuitry is responsive, in the iterative dataflow graph elaboration procedure, to a further instance of an execute instruction where an earlier instance of the execute instruction already forms part of the under-elaboration group of linked execute instructions, to add an input of the execute instruction to inputs of the configuration to perform the operations and to add an output of the execute instruction to outputs of the configuration to perform the operations.

Clause 26. The apparatus as defined in clause 2, wherein the instruction schedule monitoring circuitry is responsive, in the iterative dataflow graph elaboration procedure, to a further instance of an execute instruction where an earlier instance of the execute instruction already forms part of the under-elaboration group of linked execute instructions, to cause the configuration to perform the operations to hold a temporary value resulting from the earlier instance of the execute instruction and use the temporary value as an input of the further instance of an execute instruction.

Clause 27. The apparatus as defined in clause 2, wherein the instruction schedule monitoring circuitry is responsive, in the iterative dataflow graph elaboration procedure, to a further instance of an execute instruction where an earlier instance of the execute instruction already forms part of the under-elaboration group of linked execute instructions, to aggregate the further instance of the execute instruction with the earlier instance of the execute instruction to form a linked sequence of the instances of the execute instruction in the under-elaboration group of linked execute instructions.

Clause 28. The apparatus as defined in clause 27, wherein the instruction schedule monitoring circuitry is arranged to form the linked sequence of the instances of the execute instruction dependent on a minimum group size for the linked sequence of the instances of the execute instruction.

Clause 29. The apparatus as defined in clause 1, wherein the configurable execution circuitry comprises a plurality of functional units, wherein the plurality of functional units are arranged to forward respective functional unit result values directly to one another without the respective functional unit result values being stored in a physical register file as an intermediary.

Clause 30. The apparatus as defined in clause 29, wherein the plurality of functional units are provided by:
a coarse grained reconfigurable array;
a field-programmable gate array; and/or
a very-long-instruction-word architecture.

Clause 31. A method of data processing comprising:
retrieving a sequence of instructions, wherein the sequence of instructions comprises access instructions and execute instructions, wherein the access instructions comprise load instructions and instructions which provide operand values to load instructions;
in decoupled access-execute processing circuitry handling the access instructions using access instruction processing circuitry and handling the execute instructions in execute instruction processing circuitry, wherein the access instruction processing circuitry is capable of executing the access instructions out of program order with respect to the execute instructions, and wherein the execute instruction processing circuitry is capable of executing the execute instructions out of program order;
monitoring schedule patterns of groups of linked execute instructions, wherein the execute instructions in a group of linked execute instructions are linked by data dependencies;
identifying a repeating schedule pattern which repeats when the sequence of instructions is executed; and
in response to identification of the repeating schedule pattern, causing configurable execution circuitry to adopt a configuration to perform operations defined by the group of linked execute instructions of the repeating schedule pattern.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

We claim:

1. Apparatus comprising:
   instruction fetch circuitry to retrieve a sequence of instructions, wherein the sequence of instructions comprises access instructions and execute instructions, wherein the access instructions comprise load instructions and instructions which provide operand values to load instructions;
   decoupled access-execute processing circuitry comprising access instruction processing circuitry to handle the access instructions and execute instruction processing circuitry to handle the execute instructions, wherein the access instruction processing circuitry is capable of executing the access instructions out of program order with respect to the execute instructions, and wherein the execute instruction processing circuitry is capable of executing the execute instructions out of program order;
   instruction schedule monitoring circuitry to monitor schedule patterns of groups of linked execute instructions, wherein the execute instructions in a group of linked execute instructions are linked by data dependencies, and to identify a repeating schedule pattern which repeats when the sequence of instructions is executed; and
   configurable execution circuitry responsive to identification of the repeating schedule pattern to adopt a configuration to perform operations defined by the group of linked execute instructions of the repeating schedule pattern.

2. The apparatus as claimed in claim 1, further comprising instruction counting circuitry to maintain count values of instances of the access instructions and the execute instructions encountered in the sequence of instructions,
   wherein the instruction schedule monitoring circuitry is arranged to identify the groups of linked execute instructions using an iterative dataflow graph elaboration procedure,
   and wherein the instruction schedule monitoring circuitry is arranged to identify a set of access instructions as primary nodes for the iterative dataflow graph elaboration procedure based on the access instructions of the set of access instructions having count values in the instruction counting circuitry which are greater than an instruction count minimum and which differ by less than a threshold access instruction count difference.

3. The apparatus as claimed in claim 2, wherein the instruction schedule monitoring circuitry is arranged to perform the iterative dataflow graph elaboration procedure comprising:
   identifying candidate execute instructions for a candidate group of linked execute instructions, wherein the candidate execute instructions have one or more inputs which depend on result values of the set of access instructions identified as primary nodes, and wherein the candidate execute instructions have count values in the instruction counting circuitry which differ by less than a threshold execute instruction count difference from the count values of the set of access instructions.

4. The apparatus as claimed in claim 3, wherein the instruction schedule monitoring circuitry is arranged to perform the iterative dataflow graph elaboration procedure in a sequence of steps,
   wherein at a first step of the sequence of steps one or more first step execute instructions of the candidate execute instructions are identified, wherein the one or more first step execute instructions have one or more inputs which directly depend without intermediary on result values of the set of access instructions identified as primary nodes,
   and wherein at a subsequent step of the sequence of steps one or more subsequent execute instructions of the candidate execute instructions are identified, wherein the one or more subsequent step execute instructions have one or more inputs which directly depend without intermediary on result values of the one or more first step execute instructions.

5. The apparatus as claimed in claim 4, wherein at each further step of the sequence of steps one or more further execute instructions of the candidate execute instructions are identified, wherein the one or more further execute instructions have one or more inputs which directly depend without intermediary on result values of one or more execute instructions at an immediately preceding step.

6. The apparatus as claimed in claim 4, wherein the instruction schedule monitoring circuitry is arranged to terminate the iterative dataflow graph elaboration procedure on reaching a predetermined maximum number of steps for the sequence of steps.

7. The apparatus as claimed in claim 4, wherein the instruction schedule monitoring circuitry is arranged to terminate the iterative dataflow graph elaboration procedure on reaching a predetermined maximum number of operations for the group of linked execute instructions of the repeating schedule pattern.

8. The apparatus as claimed in claim 4, wherein the instruction schedule monitoring circuitry is arranged to terminate the iterative dataflow graph elaboration procedure on reaching a predetermined maximum number of functional units of the configurable execution circuitry required to be used in the configuration to perform the operations defined by the group of linked execute instructions of the repeating schedule pattern.

9. The apparatus as claimed in claim 4, wherein the instruction schedule monitoring circuitry is arranged to terminate the iterative dataflow graph elaboration procedure on reaching a store step of the sequence of steps at which the candidate execute instructions comprise only store instructions.

10. The apparatus as claimed in claim 4, wherein the instruction schedule monitoring circuitry is arranged to terminate the iterative dataflow graph elaboration procedure on reaching a branch step of the sequence of steps at which the candidate execute instructions comprise at least one data-dependent branch instruction.

11. The apparatus as claimed in claim 4, wherein, on reaching a branch step of the sequence of steps at which the candidate execute instructions comprise at least one data-dependent branch instruction, the instruction schedule monitoring circuitry is arranged to cause the configuration adopted by the configurable execution circuitry to comprise at least one branch outcome input indicative of a currently prevailing outcome of the at least one data-dependent branch instruction, wherein the at least one branch outcome input will cause the configurable execution circuitry to speculatively perform the operations defined by the group of linked execute instructions of the repeating schedule pattern based on the at least one branch outcome input.

12. The apparatus as claimed in claim 4, wherein, on reaching a branch step of the sequence of steps at which the candidate execute instructions comprise at least one data-dependent branch, the instruction schedule monitoring circuitry is arranged to cause the configurable execution circuitry to adopt a parallelized configuration to perform at least two parallel versions of the operations defined by the group of linked execute instructions of the repeating schedule pattern, wherein the at least two parallel versions of the operations assume different outcomes of the at least one data-dependent branch instruction, and wherein the apparatus is arranged to select between result values of the at least two parallel versions of the operations after an outcome of the at least one data-dependent branch instruction is known.

13. The apparatus as claimed in claim 4, wherein the instruction schedule monitoring circuitry is responsive to the iterative dataflow graph elaboration procedure being terminated at a final step of the sequence of steps:

to determine whether there are following execute instructions of the candidate execute instructions which receive values from the execute instructions of the final step of the sequence of steps, and when there are said following execute instructions to use the following execute instructions as new primary nodes for a new iterative dataflow graph elaboration procedure.

14. The apparatus as claimed in claim 4, wherein the instruction schedule monitoring circuitry is responsive to a required number of operations at a current step of the sequence of steps exceeding a capacity of the configurable execution circuitry by repositioning at least one operation of the current step into a subsequent step of the sequence of steps.

15. The apparatus as claimed in claim 2, wherein the instruction schedule monitoring circuitry is arranged to create a macro-instruction to substitute for the group of linked execute instructions of the repeating schedule pattern.

16. The apparatus as claimed in claim 15, wherein during further execution of the sequence of instructions substitution of the macro-instruction for the group of linked execute instructions of the repeating schedule pattern is dependent on updates for count values of the execute instructions of the group of linked execute instructions of the repeating schedule pattern not differing from one another.

17. The apparatus as claimed in claim 15, further comprising a set of primary node result FIFO buffers, wherein the configuration adopted by the configurable execution circuitry comprises arranging that result values of the set of access instructions identified as primary nodes provide inputs to the set of primary node result FIFO buffers, and outputs of the set of primary node result FIFO buffers provide input operands for the macro-instruction.

18. The apparatus as claimed in claim 15, wherein the configurable execution circuitry comprises at least one result feedback path leading from an output of the configurable execution circuitry to an input of the configurable execution circuitry, and wherein the configuration adopted by the configurable execution circuitry comprises arranging that at least one result value of the macro-instruction is provided via the at least one result feedback path to at least one input of the configurable execution circuitry.

19. The apparatus as claimed in claim 15, further comprising macro-instruction cache storage to temporarily store entries for macro-instructions created by the instruction schedule monitoring circuitry, wherein each entry comprises an indication of the group of linked execute instructions of the repeating schedule pattern, and the instruction schedule monitoring circuitry is arranged to reference the macro-instruction cache storage when performing the iterative dataflow graph elaboration procedure in order to reuse a portion of the configuration for the configurable execution circuitry generated by a previously created macro-instruction.

20. A method of data processing comprising:

retrieving a sequence of instructions, wherein the sequence of instructions comprises access instructions and execute instructions, wherein the access instructions comprise load instructions and instructions which provide operand values to load instructions;

in decoupled access-execute processing circuitry handling the access instructions using access instruction processing circuitry and handling the execute instructions in execute instruction processing circuitry, wherein the access instruction processing circuitry is capable of executing the access instructions out of program order with respect to the execute instructions, and wherein the execute instruction processing circuitry is capable of executing the execute instructions out of program order;

monitoring schedule patterns of groups of linked execute instructions, wherein the execute instructions in a group of linked execute instructions are linked by data dependencies;

identifying a repeating schedule pattern which repeats when the sequence of instructions is executed; and in response to identification of the repeating schedule pattern, causing configurable execution circuitry to adopt a configuration to perform operations defined by the group of linked execute instructions of the repeating schedule pattern.

* * * * *